US011327830B2

(12) United States Patent
Nakazawa et al.

(10) Patent No.: US 11,327,830 B2
(45) Date of Patent: *May 10, 2022

(54) SEMICONDUCTOR DEVICE AND SEMICONDUCTOR SYSTEM EQUIPPED WITH THE SAME

(71) Applicant: RENESAS ELECTRONICS CORPORATION, Tokyo (JP)

(72) Inventors: Kimihiko Nakazawa, Tokyo (JP); Takahiro Irita, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/149,041

(22) Filed: Jan. 14, 2021

(65) Prior Publication Data

US 2021/0133020 A1 May 6, 2021

Related U.S. Application Data

(63) Continuation of application No. 16/130,847, filed on Sep. 13, 2018, now Pat. No. 10,922,165.

(30) Foreign Application Priority Data

Nov. 28, 2017 (JP) .............................. JP2017-227774

(51) Int. Cl.
*G06F 11/00* (2006.01)
*G06F 11/10* (2006.01)
*G06F 12/16* (2006.01)

(52) U.S. Cl.
CPC .......... *G06F 11/10* (2013.01); *G06F 11/1016* (2013.01); *G06F 11/1028* (2013.01); *G06F 11/1044* (2013.01); *G06F 12/16* (2013.01)

(58) Field of Classification Search
CPC .. G06F 11/10; G06F 11/1016; G06F 11/1028; G06F 11/1044; G06F 12/16
See application file for complete search history.

(56) References Cited

U.S. PATENT DOCUMENTS 5,333,274 A 7/1994 Amini et al.
9,323,608 B2 4/2016 Troia
(Continued)

FOREIGN PATENT DOCUMENTS

JP 2008-250671 A 10/2008

OTHER PUBLICATIONS

Extended European Search Report issued in corresponding European Patent Application No. 18206541.7-1224, dated Mar. 28, 2019.

(Continued)

*Primary Examiner* — Joseph D Manoskey
(74) *Attorney, Agent, or Firm* — McDermott Will & Emery LLP

(57) ABSTRACT

A semiconductor device includes a master circuit which outputs a first write request signal for requesting to write data, a bus which receives the data and the first write request signal, a bus control unit which is arranged on the bus, generates an error detection code for the data and generates a second write request signal which includes second address information corresponding to first address information included in the first write request signal and memory controllers which each write the data into a storage area of an address designated by the first write request signal and writes the error detection code into a storage area of an address designated by the second write request signal in the storage areas of memories.

7 Claims, 14 Drawing Sheets

(56) References Cited

U.S. PATENT DOCUMENTS

| | | | |
|---|---|---|---|
| 9,632,869 B1 | 4/2017 | Lu et al. | |
| 2004/0068603 A1* | 4/2004 | Augsburg | G06F 13/362 |
| | | | 710/310 |
| 2007/0186141 A1* | 8/2007 | Hashimoto | H04L 1/0061 |
| | | | 714/763 |
| 2008/0215955 A1 | 9/2008 | Kimbara et al. | |
| 2009/0112563 A1* | 4/2009 | Drerup | G06F 30/33 |
| | | | 703/21 |
| 2009/0210590 A1 | 8/2009 | Circello | |
| 2009/0235113 A1 | 9/2009 | Shaeffer et al. | |
| 2015/0193297 A1 | 7/2015 | Ngo et al. | |
| 2015/0301890 A1 | 10/2015 | Marshall et al. | |
| 2016/0125960 A1 | 5/2016 | Inbar et al. | |
| 2016/0254059 A1 | 9/2016 | Ochi et al. | |
| 2017/0255509 A1 | 9/2017 | Tsuboi et al. | |
| 2017/0270063 A1* | 9/2017 | Yamanaka | G06F 13/1605 |

OTHER PUBLICATIONS

U.S. PTO Non-Final Office Action issued in related parent U.S. Appl. No. 16/130,847, dated May 27, 2020.
U S. PTO Notice of Allowance issued in related parent U.S. Appl. No. 16/130,847, dated Oct. 27, 2020.
Related parent U.S. Appl. No. 16/130,847, filed Sep. 13, 2018.

\* cited by examiner

SYS1

SEMICONDUCTOR DEVICE AND SEMICONDUCTOR SYSTEM EQUIPPED WITH THE SAME

CROSS-REFERENCE TO RELATED APPLICATIONS

This is a Continuation of U.S. patent application Ser. No. 16/130,847 filed on Sep. 13, 2018, which claims the benefit of Japanese Patent Application No. 2017-227774 filed on Nov. 28, 2017 including the specification, drawings and abstract are incorporated herein by reference in their entirety.

BACKGROUND

The present invention relates to a semiconductor device and a semiconductor system equipped with the semiconductor device and relates to, for example, the semiconductor device which is suited for improving reliability and the semiconductor system equipped with the semiconductor device.

In a recent semiconductor system, detection of an error and correction of a bit in data which is read out of a memory are performed by using an ECC (Error Detection Code). Therefore, the semiconductor system is able to improve the reliability while suppressing an increase in circuit scale in comparison with a case of duplexing a circuit configuration and comparing results thereof with each other.

A technology pertaining to the ECC is disclosed in Japanese Unexamined Patent Application Publication No. 2008-250671. In a device disclosed in Japanese Unexamined Patent Application Publication No. 2008-250671, a memory controller writes data received from a CPU (Central Processing Unit) into an external memory and writes a syndrome code which is prepared on the basis of the data concerned into an ECC memory when data writing. In addition, the memory controller reads out the data stored in the external memory and reads out the syndrome code for the data concerned which is stored in the ECC memory when data reading. Thereafter, the memory controller detects the error in the read-out data and performs bit correction when possible by using that syndrome code.

SUMMARY

However, the configuration in Japanese Unexamined Patent Application Publication No. 2008-250671 had such an issues that in a case where a bit error occurs in a part which is common between an address signal used for performing data access to the external memory and an address signal used for performing syndrome-code access to the ECC memory, the data and the syndrome code therefor which are stored in storage areas of wrong addresses are read out respectively and consequently the error is not detected in ECC checking. That is, the configuration in Japanese Unexamined Patent Application Publication No. 2008-250671 had such an issue that that it is still impossible to improve the reliability. Other subjects and novel features will become apparent from the description of the specification of the present invention and the appended drawings.

According to one embodiment of the present invention, there is provided a semiconductor device which includes a master circuit which outputs a first write request signal used for requesting to write data, a bus which receives the data and the first write request signal, a bus control unit which is arranged on the bus, generates an error detection code for the data and generates a second write request signal which includes second address information corresponding to first address information included in the first write request signal and a memory controller which writes the data transmitted from the bus into a storage area of an address which is designated by the first write request signal transmitted from the bus and writes the error detection code transmitted from the bus into a storage area of an address which is designated by the second write request signal transmitted from the bus in storage areas of a memory.

According to another embodiment of the present invention, there is provided a semiconductor device which includes a master circuit which generates a first read request signal used for requesting to read data written into a memory, a bus which receives the first read request signal, a bus control unit which is arranged on the bus and generates a second read request signal including second address information corresponding to first address information included in the first read request signal and a memory controller which reads the data stored in a storage area of an address designated by the first read request signal which is transmitted from the bus and reads an error detection code for the data which is stored in a storage area of an address designated by the second read request signal which is transmitted from the bus in storage areas of the memory.

According to the above-described one embodiment, it is possible to provide the semiconductor device which is able to improve the reliability and a semiconductor device equipped with the semiconductor device.

DETAILED DESCRIPTION

Figure 1:
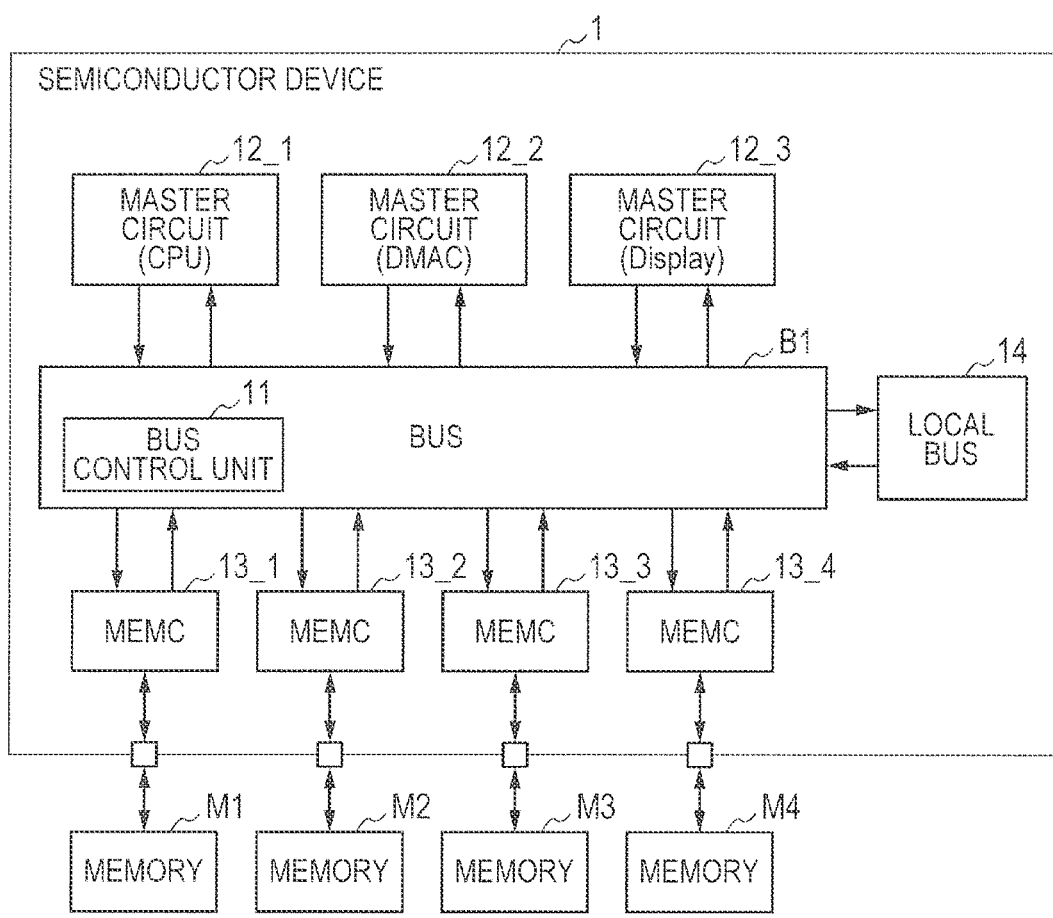
FIG. 1 is a block diagram illustrating one configuration example of a semiconductor system according to a first embodiment.

For clarification of description, the following description and drawings are appropriately omitted and simplified. In addition, each of elements which are illustrated in the drawings as functional blocks for performing various types of processing is able to be configured by a CPU (Central Processing Unit), a memory and other circuits in hardware and is implemented by a program and so forth which is loaded into a memory and so forth in software. Accordingly, a person skilled in the art would understand that these functional blocks are able to be realized/implemented in various forms only by hardware, only by software or by a combination of the hardware and the software and are not limited to any one of them. Incidentally, in the respective drawings, the same numerals are assigned to the same elements and duplicated description thereof is omitted as necessary.

In addition, it is possible to store the above-described program by using various types of non-temporary computer-readable media and to supply the program to a computer. The non-temporary computer-readable media include various types of substantial recording media. Examples of the non-temporary computer-readable media include magnetic recording media (for example, a flexible disc, a magnetic tape, a hard disc drive and so forth), a magneto-optical recording medium (for example, a magneto-optical disc), a CD-ROM (Read Only Memory), a CD-R (Compact Disc-Recordable), a CD-R/W (Compact Disc-ReWritable) and semiconductor memories (for example, a mask ROM, a PROM (Programmable ROM), an EPROM (Erasable PROM), a flash ROM, a RAM (Random Access Memory). In addition, the program may be supplied to the computer by means of various types of temporary computer-readable media. Examples of the temporary computer-readable media include an electric signal, an optical signal and an electromagnetic wave. The temporary computer-readable media are able to supply the program to the computer via a wired communication path using an electric wire, an optical fiber and so forth or a wireless communication path.

First Embodiment

FIG. 1 is a block diagram illustrating one configuration example of a semiconductor device 1 according to the first embodiment and a semiconductor system SYS1 equipped with the semiconductor device 1.

As illustrated in FIG. 1, the semiconductor system SYS1 includes four memories M1 to M4 and the semiconductor device 1 which accesses the memories M1 to M4. Incidentally, although in the present embodiment, a case where the four memories M1 to M4 are arranged is described by way of example, the number of the memories is not limited to four and it is sufficient to arrange two or more memories.

The semiconductor device 1 includes master circuits such as a CPU 12_1, a DMAC (Direct Memory Access Controller) 12_2, a display 12_3 and so forth (in the following, also referred to as the master circuit 12 simply), a bus B1, a local bus 14 and four memory controllers (MEMCs) 13_1 to 13_4. A bus control unit 11 is arranged on the bus B1.

Incidentally, although in the present embodiment, a case where the four memory controllers 13_1 to 13_4 are arranged is described byway of example, the number of the memory controllers is not limited to four, two or more memory controllers may be arranged in accordance with the number of the memories.

For example, the master circuit 12 such as the CPU and so forth issues a request (generates a request signal) and transmits the request to the bus B1. The bus control unit 11 requests one memory controller which is designated in the memory controllers 13_1 to 13_4 to access the corresponding memory on the basis of the request from the master circuit 12 on the bus B1. Thereby, the designated memory controller accesses the corresponding memory. Results of access to the memory (read-out data, a response signal and so forth) are transmitted to the master circuit 12 via the bus B1. Incidentally, it is also possible for the bus control unit 11 to access another/other slave (s) via the bus B1 and the local bus 14 on the basis of the request from the master circuit 12.

(First Specific Configuration Example of Data Writing Circuit Part Arranged in Semiconductor Device 1)

Figure 2:
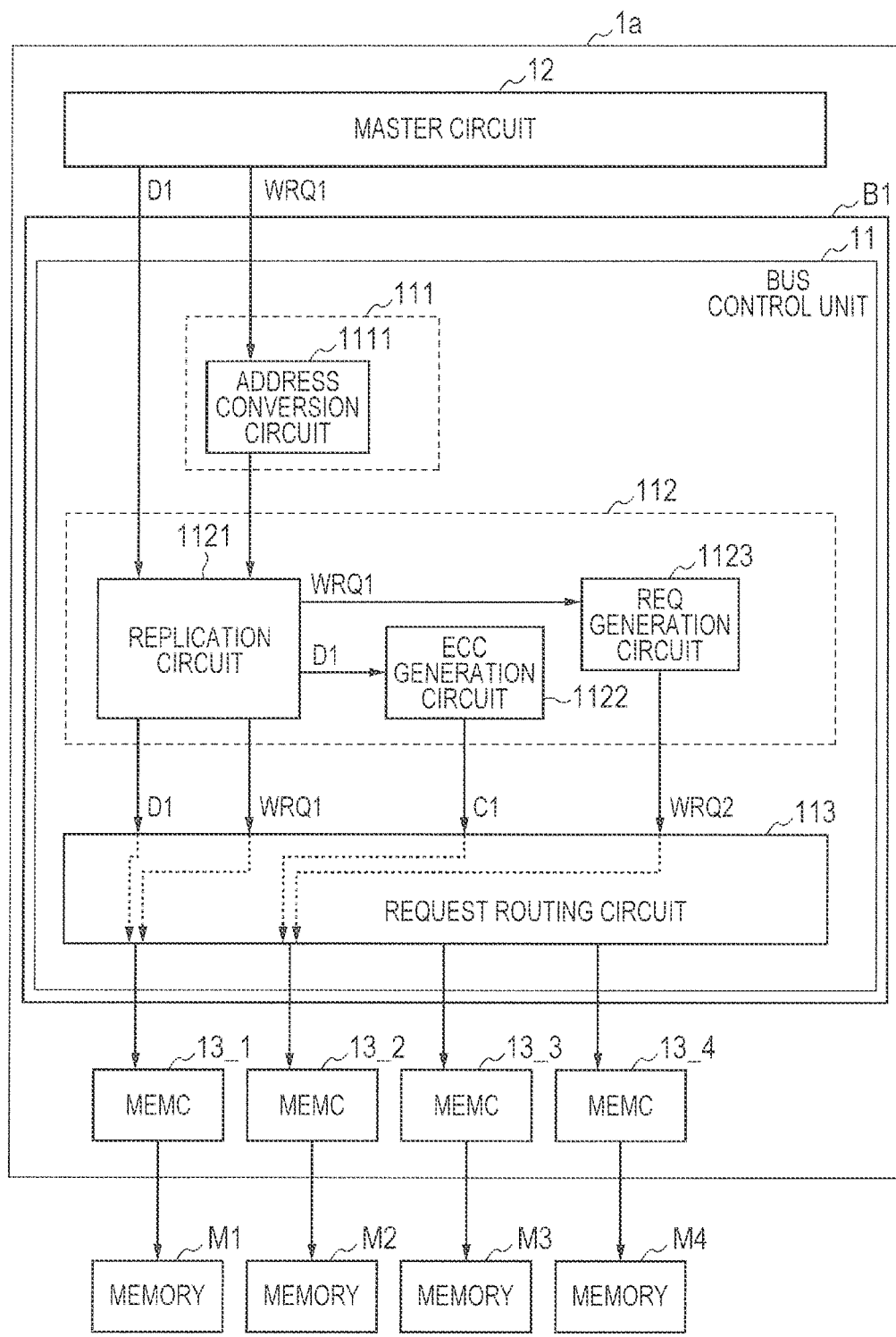
FIG. 2 is a block diagram illustrating a first specific configuration example of a data writing circuit part provided in a semiconductor device illustrated in FIG. 1.

FIG. 2 is a block diagram illustrating the first specific configuration example of the data writing circuit part arranged in the semiconductor device 1 as a semiconductor device 1a. Incidentally, also the memories M1 to M4 are illustrated in addition to the semiconductor device 1a in FIG. 2.

As illustrated in FIG. 2, the semiconductor device 1a includes the master circuit 12, the bus control unit 11 arranged on the bus B1 and the memory controllers 13_1 to 13_4 as the data writing circuit part. The bus control unit 11 includes an address adjustment section 111, an ECC adjustment section 112 and a request routing circuit 113.

The master circuit 12 generates, for example, data D1 to be written and a request signal (in the following, referred to as a write request signal) WRQ1 used for requesting to write the data D1 and outputs the data D1 and the write request signal WRQ1 to the bus B1. Incidentally, granularity (a burst, a size, a length and so forth), an ID (Identification), address information and so forth of the data D1 are included in the write request signal WRQ1.

The address adjustment section 111 has an address conversion circuit 1111. The address conversion circuit 1111 changes a bit width of the address information included in the write request signal WRQ1 from the master circuit 12 to a bit width which conforms to the standard of the memories M1 to M4.

The ECC adjustment section 112 generates an error detection code C2 on the basis of the data D1 to be written which is output from the master circuit 12 and generates a write request signal WRQ2 used for the error detection code C1 on the basis of the write request signal WRQ1.

Specifically, the ECC adjustment section 112 has a replication circuit 1121, an ECC generation circuit 1122 and an ECC request generation circuit 1123. The replication circuit 1121 replicates the data D1 and the write request signal WRQ1 respectively. The ECC generation circuit 1122 generates the error detection code C1 for the data D1 on the basis of the data D1 which is replicated by the replication circuit 1121. For example, the ECC generation circuit 1122 generates the error detection code C1 of an 8-bit width for the data D1 of a 64-bit width. The ECC request generation circuit 1123 generates a write request signal WRQ2 used for the error detection code CI which includes address information corresponding to the address information included in the write request signal WRQ1 concerned on the basis of the write request signal WRQ1 which is replicated by the replication circuit 1121 and outputs the generated write request signal WRQ2 via a signal path which is different from that of the write request signal WRQ1. In the present embodiment, since the memory into which the data D1 is to be written is different from the memory into which the error detection code C1 is to be written, respective pieces of the address information thereof may have the same value. In addition, the ECC request generation circuit 1123 gives another ID which is related to the ID given to the write request signal WRQ1 to the write request signal WRQ2. Thereby, it becomes possible to make combinations for the data D1 and for the error detection code C1 for the data D1 coincide with each other.

The request routing circuit 113 allocates a plurality of requests from the master circuit 12 and the ECC adjustment section 112 to any of the four memory controllers 13_1 to 13_4. For example, the request routing circuit 113 allocates a combination of the data D1 and the write request signal WRQ1 to the memory controller 13_1 and allocates a combination of the error detection code C1 and the write request signal WRQ2 to the memory controller 13_2.

The memory controllers 13_1 to 13_4 access the memories M1 to M4 respectively. For example, when the write request signal WRQ1 is received, the memory controller 13_1 writes the data D1 into a storage area of an address which is designated by the address information included in the write request signal WRQ1 in the storage areas of the memory M1. In addition, when the write request signal WRQ2 is received, the memory controller 13_2 writes the error detection code C1 for the data D1 into a storage area of an address which is designated by the address information included in the write request signal WRQ2 in the storage areas of the memory M2.

Data Writing Operation of Semiconductor Device 1a

Figure 3:
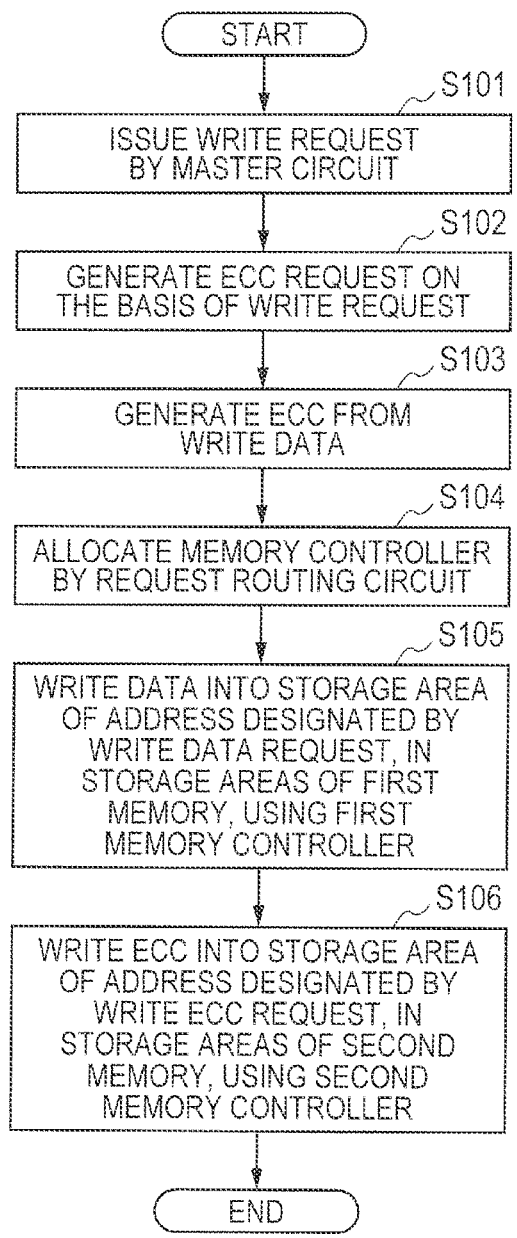
FIG. 3 is a flowchart illustrating one example of a writing operation of the semiconductor device illustrated in FIG. 2.

Then, the data writing operation of the semiconductor device 1a illustrated in FIG. 2 will be described by using FIG. 3. FIG. 3 is a flowchart illustrating one example of the data writing operation of the semiconductor device 1a.

First, the data D1 to be written and the write request signal WRQ1 are generated by the master circuit 12 and are supplied to the bus B1 (step S101).

Thereafter, adjustment of the bit width of the address information included in the write request signal WRQ1 is performed by the address adjustment section 111. Thereafter, the write request signal WRQ2 corresponding to the write request signal WRQ1 is generated (step S102) and the error detection code C1 for the data D1 is generated (step S103) by the ECC adjustment section 112.

Thereafter, for example, the data D1 and the write request signal WRQ1 are allocated to the memory controller 13_1 and the error detection code C1 and the write request signal WRQ2 are allocated to the memory controller 13_2 by the request routing circuit 113 (step S104).

When the write request signal WRQ1 is received, the memory controller 13_1 writes the data D1 into the storage area of the address which is designated by the address information included in the write request signal WRQ1 in the storage areas of the memory M1 (step S105). In addition, when the write request signal WRQ2 is received, the memory controller 13_2 writes the error detection code C1 for the data D1 into the storage area of the address which is designated by the address information included in the write request signal WRQ2 in the storage areas of the memory M2 (step S106).

In the semiconductor device 1 according to the present embodiment and the semiconductor system SYS1 equipped with the semiconductor device 1, the bus control unit 11 which is arranged on the bus B1 generates the write request signal WRQ2 which is different from the write request signal WRQ1 on the basis of the write request signal WRQ1 received from the master circuit 12 in this way. Then, the bus control unit 11 transmits the write request signal WRQ1 to the memory controller 13_1 and makes the memory controller 13_1 write the data D1 into the memory M1 and transmits the write request signal WRQ2 to the memory controller 13_2 via the signal path which is different from the signal path of the write request signal WRQ1 and makes the memory controller 13_2 write the error detection code C1 for the data D1 into the memory M2.

That is, in the semiconductor device 1 according to the present embodiment and the semiconductor system SYS1 equipped with the semiconductor device 1, paths for memory access between the bus B1 which is arranged between the CPU and the memory controllers and the memory controller 13_1 and between the bus B1 and the memory controller 13_2 are different from each other unlike the case of the configuration in Japanese Unexamined Patent Application Publication No. 2008-250671. For this reason, in a case where a bit error occurs in either one of an address signal which is transmitted from the bus B1 to the memory M1 via the memory controller 13_1 and an address signal which is transmitted from the bus B1 to the memory M2 via the memory controller 13_2, the combinations for the data D1 and for the error detection code C1 which are read out become different from each other and therefore it is possible to correctly detect the error in ECC checking. Thereby, it becomes possible for the semiconductor device 1 according to the first embodiment and the semiconductor system SYS1 equipped with the semiconductor device 1 to improve the reliability.

(First Specific Configuration Example of Data Reading Circuit Part Arranged in Semiconductor Device 1a)

Figure 4:
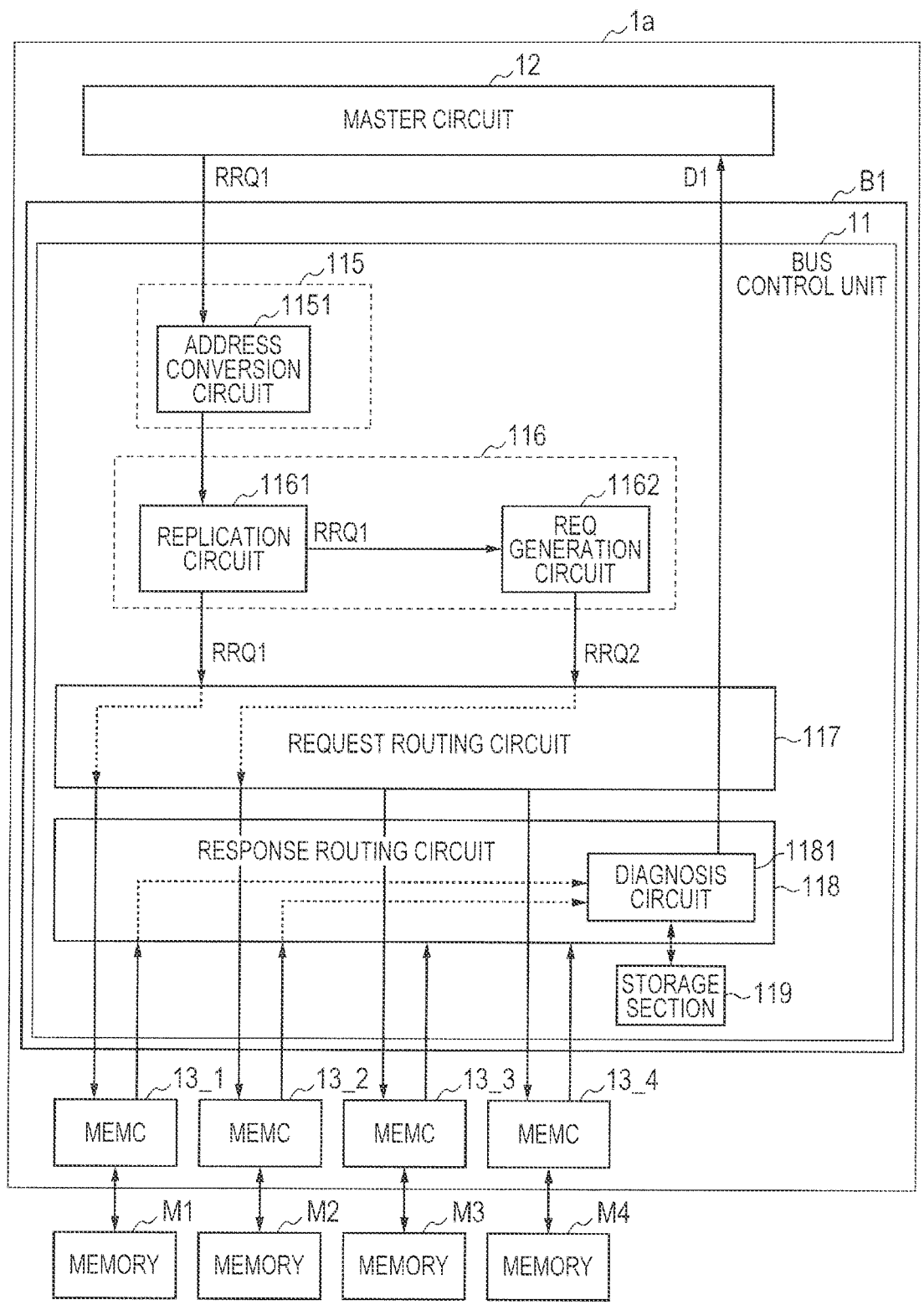
FIG. 4 is a block diagram illustrating a first specific configuration example of a data reading circuit part provided in the semiconductor device illustrated in FIG. 1.

FIG. 4 is a block diagram illustrating the first specific configuration example of the data reading circuit part arranged in the semiconductor device 1a. Incidentally, also the memories M1 to M4 are illustrated in addition to the semiconductor device 1a in FIG. 4.

As illustrated in FIG. 4, the semiconductor device 1a includes the master circuit 12, the bus control unit 11 arranged on the bus B1 and the memory controllers 13_1 to 13_4 as the data reading circuit part. The bus control unit 11 includes an address adjustment section 115, an ECC adjustment section 116, a request routing circuit 117, a response routing circuit 118 and a storage section 119. Incidentally, although a case where the address adjustment section 115, the ECC adjustment section 116, the request routing circuit 117 and the response routing circuit 118 used for data reading are provided separately from those used for data writing will be described, these elements may be shared between the data reading and the data writing.

The master circuit 12 generates, for example, a request signal (in the following, referred to as a read request signal) RRQ1 used for requesting to read the data D1 and outputs the read request signal RRQ1 to the bus B1. Incidentally, the ID, the address information and so forth are included in the read request signal RRQ1.

The address adjustment section 115 has an address conversion circuit 1151. The address conversion circuit 1151 changes the bit width of the address information included in the read request signal RRQ1 from the master circuit 12 to the bit width which conforms to the standard of the memories M1 to M4.

The ECC adjustment section 116 generates a read request signal RRQ2 used for the error detection code C1 which corresponds to the data D1 to be read out on the basis of the read request signal RRQ1 output from the master circuit 12.

Specifically, the ECC adjustment section 116 has a replication circuit 1161 and an ECC request generation circuit 1162. The replication circuit 1161 replicates the read request signal RRQ1. The ECC request generation circuit 1162 generates the read request signal RRQ2 used for the error detection code C1 which is different from the read request signal RRQ1 concerned on the basis of the read request signal RRQ1 which is replicated by the replication circuit 1161 and outputs the generated read request signal RRQ2 via the signal path which is different from the signal path of the read request signal RRQ1. In the present embodiment, since the memory out of which the data D1 is read is different from the memory out of which the error detection code C1 is read, respective pieces of the address information may have the same value. In addition, the ECC request generation circuit 1162 gives another ID which is related to the ID which is given to the read request signal RRQ1 to the read request signal RRQ2. Thereby, it becomes possible to make the combinations for the data D1 and for the error detection code C1 for the data D1 which are read out coincide with each other.

The request routing circuit 117 allocates the plurality of requests from the master circuit 12 and the ECC adjustment section 116 to any of the four memory controllers 13_1 to 13_4. For example, the request routing circuit 117 allocates the read request signal RRQ1 to the memory controller 13_1 and allocates the read request signal RRQ2 to the memory controller 13_2.

The memory controllers 13_1 to 13_4 access the memories M1 to M4 respectively. For example, when the read request signal RRQ1 is received, the memory controller 13_1 reads the data D1 stored in the storage area of the address which is designated by the address information included in the read request signal RRQ1 in the storage areas of the memory M1. In addition, when the read request signal RRQ2 is received, the memory controller 13_2 reads the error detection code C1 for the data D1 stored in the storage area of the address which is designated by the address information included in the read request signal RRQ2 in the storage areas of the memory M2.

The response routing circuit 118 is a circuit which selects and sends a plurality of pieces of data which are read out of the memories M1 to M4 back to the master circuit 12 in order.

Here, the response routing circuit 118 has a diagnosis circuit 1181 and the diagnosis circuit 1181 detects an error in the read-out data D1 and performs bit correction when possible by using the error detection code C1 which is read out of the memory M2.

Incidentally, the data D1 and the error detection code C1 for the data D1 are read out of the mutually different memories M1 and M2 and therefore are not necessarily read out in succession. Therefore, in the data D1 and the error detection code C1 for the data D1, one data which is read out first (for example, the data D1) and the ID thereof are stored into the storage section 119. Then, when the other data (for example, the error detection code C1) having the ID which is related to the ID of one data stored in the storage section 119 is read out, the diagnosis circuit 1181 detects the error in the data D1 and performs bit correction when possible by using the error detection code C1 in these pieces of data. Incidentally, it is possible to utilize the storage section 119 also as a primary storage area for data used for accessing another/other slave(s) which is/are coupled via the bus B1 and the local bus 14.

The data D1 that the error is not detected or the data D1 which is corrected by the diagnosis circuit 1181 is sent back to the master circuit 12 as scheduled. On the other hand, the data D1 that the error is detected but is not corrected is sent back to the master circuit 12 as it is and also error information is sent back simultaneously.

Data Reading Operation of Semiconductor Device 1a

Figure 5:
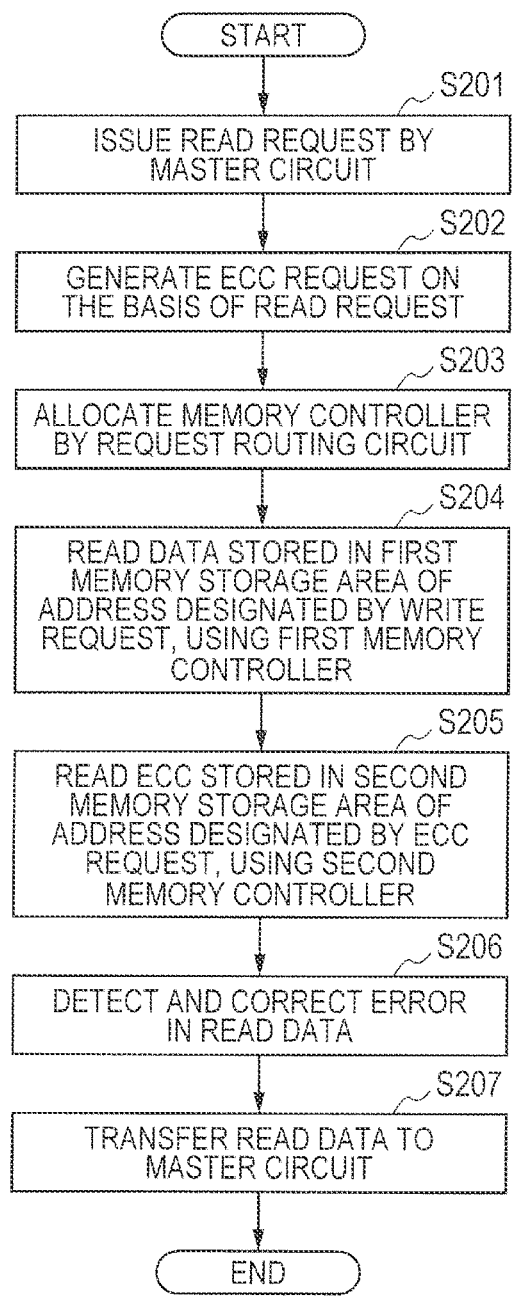
FIG. 5 is a flowchart illustrating one example of a reading operation of the semiconductor device illustrated in FIG. 4.

Then, the data reading operation of the semiconductor device 1a illustrated in FIG. 4 will be described by using FIG. 5. FIG. 5 is a timing chart illustrating one example of the data reading operation of the semiconductor device 1a.

First, the read request signal RRQ1 is generated by the master circuit 12 and is supplied to the bus B1 (step S201).

Thereafter, the bit-width of the address information included in the read request signal RRQ1 is adjusted by the address adjustment section 115. Thereafter, the read request signal RRQ2 corresponding to the read request signal RRQ1 is generated by the ECC adjustment section 116 (step S202).

Thereafter, for example, the read request signal RRQ1 is allocated to the memory controller 13_1 and the read request signal RRQ2 is allocated to the memory controller 13_2 by the request routing circuit 117 (step S203).

When the read request signal RRQ1 is received, the memory controller 13_1 reads the data D1 stored in the storage area of the address which is designated by the address information included in the real request signal RRQ1 in the storage areas of the memory M1 (step S204). In addition, when the read request signal RRQ2 is received, the memory controller 13_2 reads the error detection code C1 stored in the storage area of the address which is designated by the address information included in the real request signal RRQ2 in the storage areas of the memory M2 (step S205).

Thereafter, the plurality of pieces of data which are read out of the memories M1 and M4 are selected and sent back to the master circuit 12 in order by the response routing circuit 118. Here, the diagnosis circuit 1181 arranged in the response routing circuit 118 detects the error in the read-out data D1 and performs the bit correction when possible by using the error detection code C1 which is read out of the memory M2 (step S206).

As a result of diagnosis by the diagnosis circuit 1181, the data D1 whose error is not detected or the data D1 that the error is detected but is corrected is sent back to the master circuit 12 as scheduled (step S207). On the other hand, the data D1 that the error is detected but is not corrected is sent back to the master circuit 12 as it is and also the error information is sent back simultaneously.

In the semiconductor device 1 according to the present embodiment and the semiconductor system SYS1 equipped with the semiconductor device 1, the bus control unit 11 arranged on the bus B1 generates the read request signal RRQ2 which is different from the read request signal RRQ1 on the basis of the read request signal RRQ1 received from the master circuit 12 in this way. Then, the bus control unit 11 transmits the read request signal RRQ1 to the memory controller 13_1 and makes the memory controller 13_1 read the data D1 stored in the memory M1 and transmits the read request signal RRQ2 to the memory controller 13_2 via the signal path which is different from the signal path of the read request signal RRQ1 and makes the memory controller 13_2 read the error detection code C1 for the data D1 stored in the memory M2.

That is, in the semiconductor device 1 according to the present embodiment and the semiconductor system SYS1 equipped with the semiconductor device 1, the paths for memory access between the bus B1 which is arranged between the CPU and the memory controllers and the memory controller 13_1 and between the bus B1 and the memory controller 13_2 are different from each other unlike the case of Japanese Unexamined Patent Application Publication No. 2008-250671. For this reason, in a case where the bit error occurs in either one of the address signal which is transmitted from the bus B1 to the memory M1 via the memory controller 13_1 and the address signal which is transmitted from the bus B1 to the memory M2 via the memory controller 13_2, the combinations for the data D1 and for the error detection code C1 which are read out become different from each other and therefore it is possible to correctly detect the error in ECC checking. Thereby, it becomes possible for the semiconductor device 1 according to the present embodiment and the semiconductor system SYS1 equipped with the semiconductor device 1 to improve the reliability.

Incidentally, the specific configuration of the semiconductor device 1 is not limited to the configuration of the above-described semiconductor device 1a. In the following, other specific configuration examples will be described.
(Second Specific Configuration Example of Data Writing Circuit Part Arranged in Semiconductor Device 1)

Figure 6:
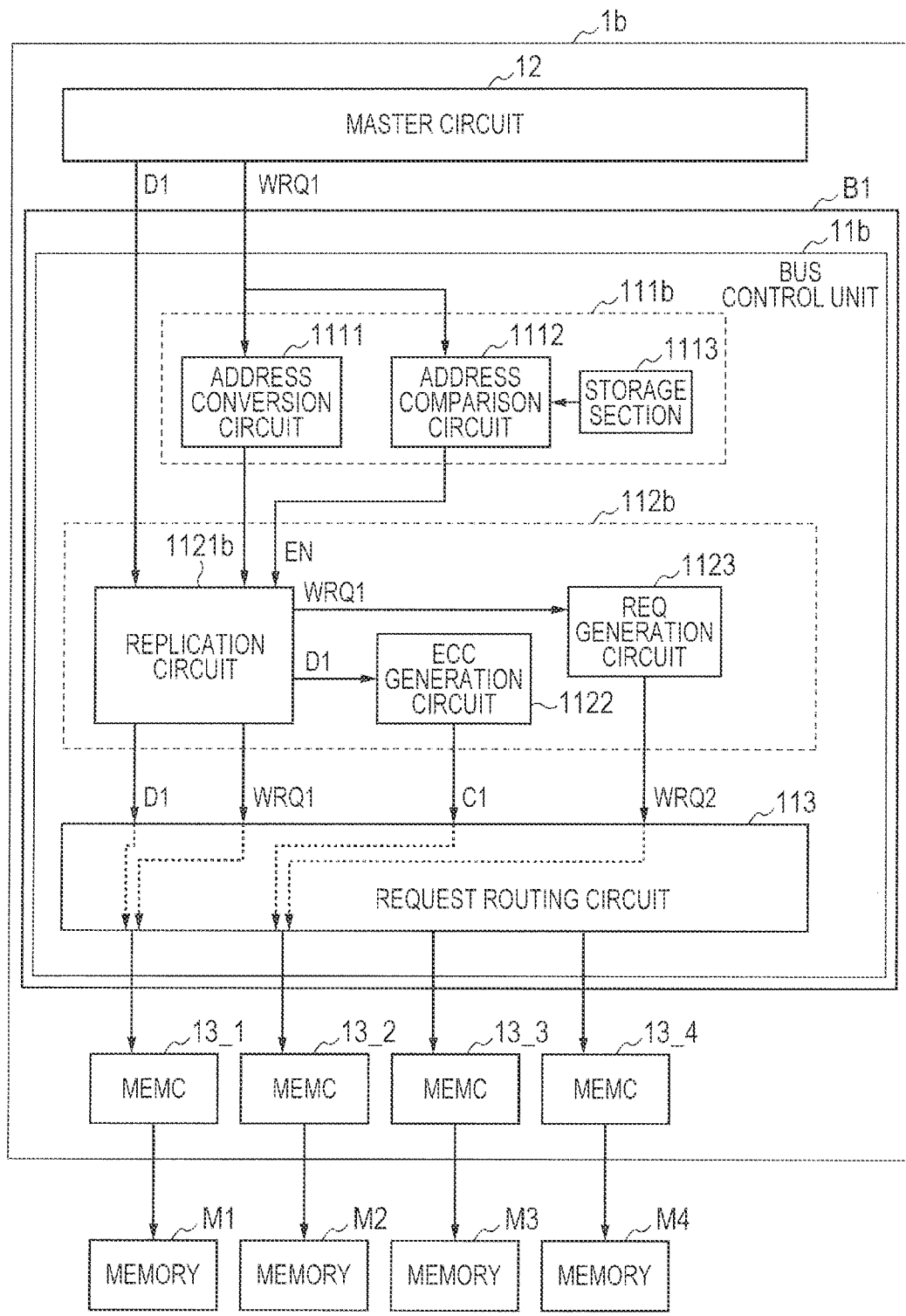
FIG. 6 is a block diagram illustrating a second specific configuration example of the data writing circuit part provided in the semiconductor device illustrated in FIG. 1.

FIG. 6 is a block diagram illustrating the second specific configuration example of the data writing circuit part arranged in the semiconductor device 1 as a semiconductor device 1b. Incidentally, also the memories M1 to M4 are illustrated in addition to the semiconductor device 1b in FIG. 6.

The semiconductor device 1b illustrated in FIG. 6 includes a bus control unit 11b in place of the bus control unit 11 when compared with the semiconductor device 1a illustrated in FIG. 2. The bus control unit 11b is different in configuration of the address adjustment section and the ECC adjustment section 112 when compared with the bus control section 11.

Specifically, an address adjustment section 111b further includes an address comparison circuit (a decision circuit) 1112 and a storage section 1113 in addition to the address conversion circuit 1111. The address information for the write request signal WRQ1 which corresponds to the write data D1 which is a generation object for the error detection code C1 is stored in the storage section 1113 in the plurality of write request signals WRG1. The address comparison circuit 1112 decides whether the address information for the write request signal WRQ1 which is output from the master circuit 12 coincides with any one of the plurality of pieces of address information stored in the storage section 1113.

For example, in a case where the address information for the write request signal WRQ1 which is output from the master circuit 12 coincides with any one of the plurality of pieces of address information stored in the storage section 1113, the address comparison circuit 1112 decides that the write data D1 which is output together with the write request signal WRQ1 concerned is the generation object for the error detection code C1 and activates an enable signal EN. On the other hand, in a case where the address information for the write request signal WRQ1 which is output from the master circuit 12 coincides with none of the plurality of pieces of address information stored in the storage section 1113, the address comparison circuit 1112 decides that the write D1 which is output together with the write request signal RG1 concerned is not the generation object for the error detection code C1 and deactivates (does not activate) the enable signal EN.

In an ECC adjustment section 112b, a replication circuit 1121b replicates the data D1 and the write request signal WRQ1 only in a case where the enable signal EN is activated and outputs the replicated data D1 and the write request signal WRQ1 to the ECC generation circuit 1122 and the ECC request generation circuit 1123 respectively. Since other configurations of the ECC adjustment section 112b are the same as those in the case of the ECC adjustment section 112 and therefore description thereof is omitted.

Since other configurations of the data writing circuit part of the bus control unit 11b are the same as those in the case of the bus control unit 11, description thereof is omitted.
(Data Writing Operation of Semiconductor Device 1b)

Figure 7:
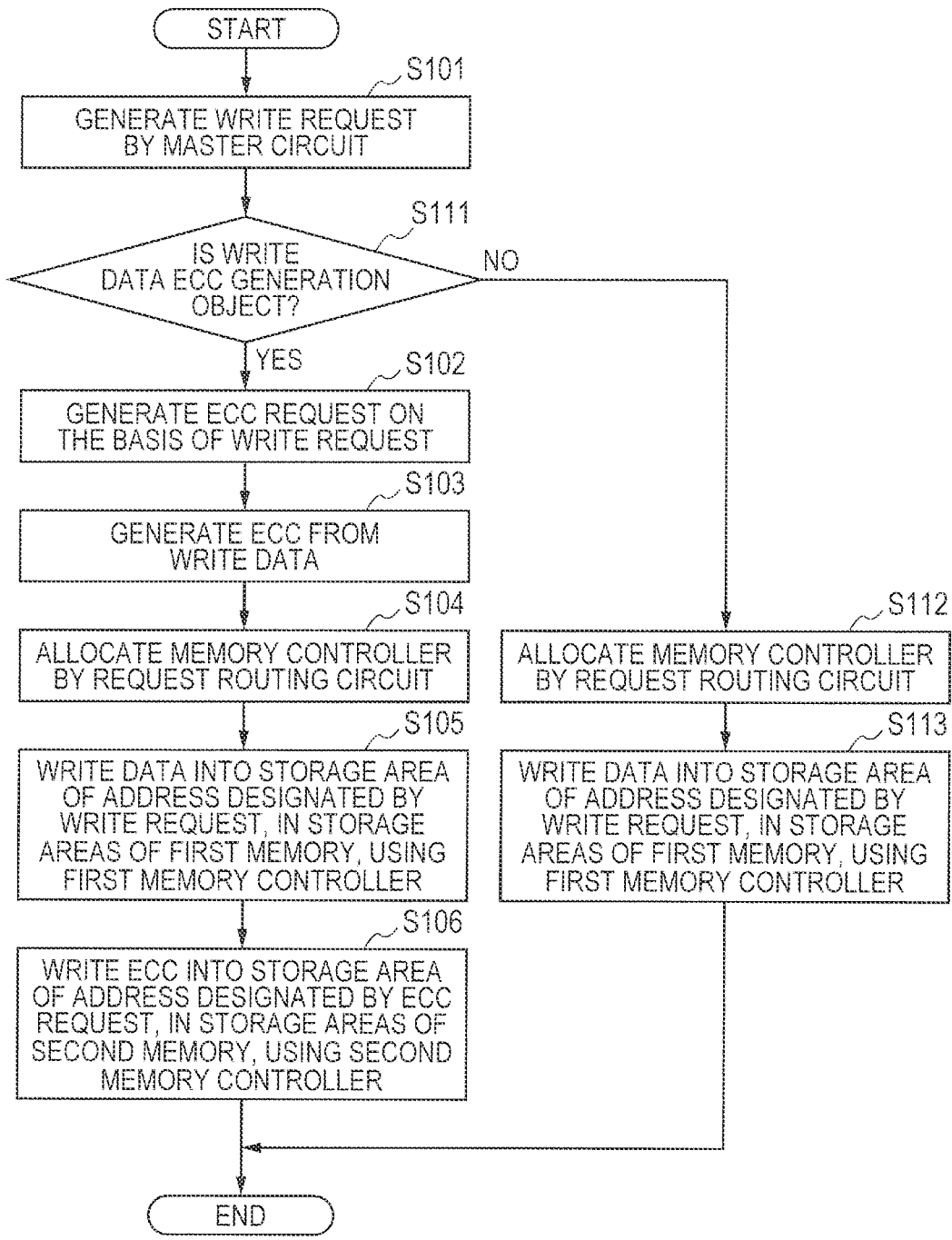
FIG. 7 is a flowchart illustrating one example of the writing operation of the semiconductor device illustrated in FIG. 6.

Then, the data writing operation of the semiconductor device 1b illustrated in FIG. 6 will be described using FIG. 7. FIG. 7 is a flowchart illustrating one example of the data writing operation of the semiconductor device 1b. Incidentally, in the following, operations which are different from those of the semiconductor device 1a will be mainly described.

First, the data D1 to be written and the write request signal WRQ1 are generated by the master circuit 12 and are supplied to the bus B1 (step S101).

Thereafter, adjustment of the bit width of the address information included in the write request signal WRQ1 is performed by the address adjustment section 111b. In addition, it is decided whether the data D1 to be written which is output together with the write request signal WRQ1 concerned is the generation object for the error detection code C1 (step S111).

For example, in a case where the data D1 to be written is the generation object for the error detection code C1 (YES in step S111), the write request signal WRQ2 is generated (step S102) and the error detection code C1 for the data D1 is generated (step S105) similarly to the case of the semiconductor device 1a. Data writing processing which is similar to that in the case of the semiconductor device 1a is performed still after that (step S104 to step S106).

On the other hand, in a case where the data D1 to be written is not the generation object for the error detection code C1 (NO in step S111), generation of the write request signal WRQ2 and the error detection code C1 is not performed. Thereafter, for example, the data D1 and the write request signal WRQ1 are allocated to the memory controller 13_1 by the request routing circuit 113 (step S112). Then, when the write request signal WRQ1 is received, the memory controller 13_1 writes the data D1 into the storage area of the address which is designated by the address information included in the write request signal WRQ1 in the storage areas of the memory M1 (step S113).
(Second Specific Configuration Example of Dara Reading Circuit Part Arranged in Semiconductor Device 1b)

Figure 8:
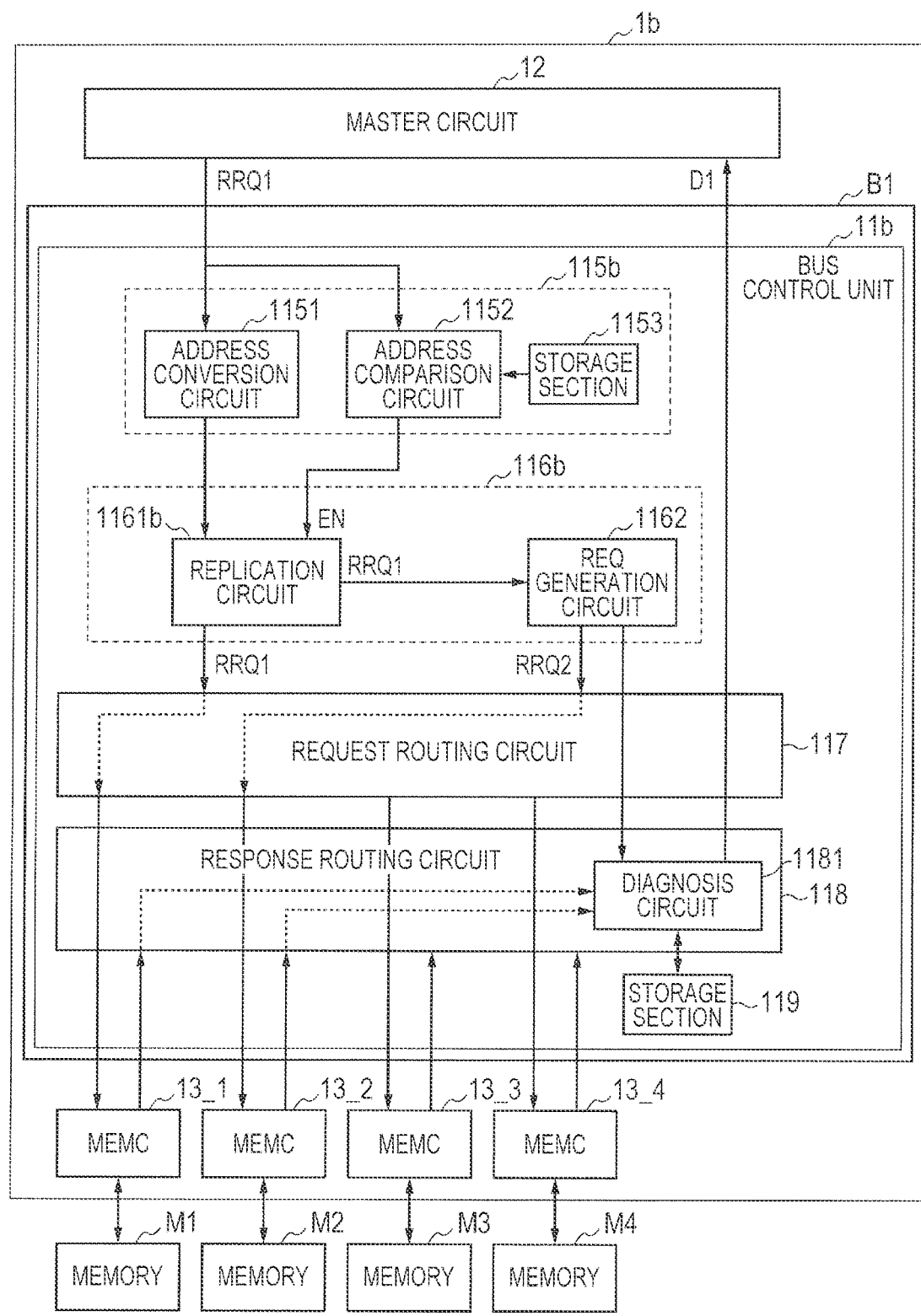
FIG. 8 is a block diagram illustrating a second specific configuration example of the data reading circuit part provided in the semiconductor device illustrated in FIG. 1.

FIG. 8 is a block diagram illustrating the second specific configuration example of the data reading circuit part arranged in the semiconductor device 1b. Incidentally, also the memories M1 to M4 are illustrated in addition to the semiconductor device 1b in FIG. 8.

The semiconductor device 1b illustrated in FIG. 8 includes the bus control unit 11b in place of the bus control unit 11 when compared with the semiconductor device 1a illustrated in FIG. 4. The bus control unit 11b is different in configuration of the address adjustment section 115 and the ECC adjustment section 116 when compared with the bus control unit 11.

Specifically, an address adjustment section 115*b* further includes an address comparison circuit 1152 and a storage section 1153 in addition to the address conversion circuit 1151. The address information (equivalent to the contents stored in the storage section 1113) for the read request signal RRQ1 which corresponds to the data D1 which is the generation object for the error detection code C1 in the plurality of read request signals RRQ1 is stored in the storage section 1153. The address comparison circuit 1152 decides whether the address information for the read request signal RRQ2 which is output from the master circuit 12 coincides with any one of the plurality of pieces of address information stored in the storage section 1153.

For example, in a case where the address information for the read request signal RRQ1 output from the master circuit 12 coincides with any one of the plurality of pieces of address information stored in the storage section 1153, the address comparison circuit 1152 decides that the data D1 which is scheduled to be read out in accordance with the read request signal RRQ1 concerned is the generation object for the error detection code C1 and activates the enable signal EN. On the other hand, in a case where the address information for the read request signal RRQ1 which is output from the master circuit 12 coincides with none of the plurality of pieces of address information stored in the storage section 1153, the address comparison circuit 1152 decides that the D1 which is scheduled to be read out in accordance with the read request signal RRQ1 concerned is not the generation object for the error detection code C1 and deactivates (does not activate) the enable signal EN.

In an ECC adjustment section 116*b*, only in a case where the enable signal EN is activated, a replication circuit 1161*b* replicates the read request signal RRQ1 and outputs the replicated read request signal RRQ1 to an ECC request generation circuit 1162. The ECC request generation circuit 1162 generates the read request signal RRQ2 used for reading the error detection code C1 on the basis of the read request signal RRQ1 and outputs the generated read request signal RRQ2 via the signal path which is different from the signal path of the read request signal RRQ1. Incidentally, information on the IDs given to the read request signals RRQ1 and RRQ2 is transmitted to the diagnosis circuit 1181. Then, the diagnosis circuit 1181 makes a diagnosis (ECC checking) only on the read data D1 having those IDs. Since other configurations of the ECC adjustment section 116*b* are the same as those in the case of the ECC adjustment section 116, description thereof is omitted.

Since other configurations of the read reading circuit part of the bus control unit 11*b* are the same as those in the case of the bus control unit 11, description thereof is omitted.

(Data Reading Operation of Semiconductor Device 1*b*)

Figure 9:
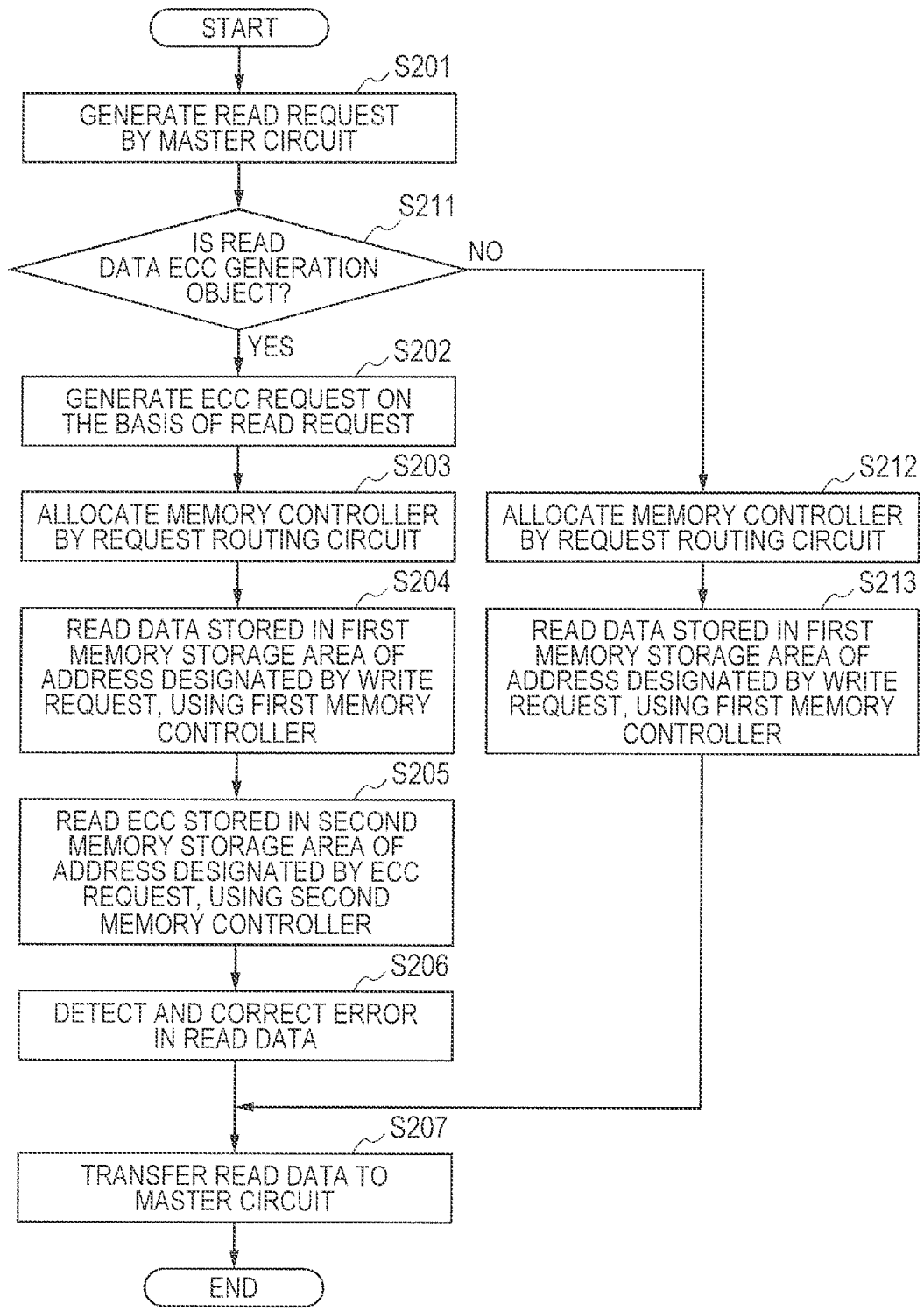
FIG. 9 is a flowchart illustrating one example of the reading operation of the semiconductor device illustrated in FIG. 8.

Then, the data reading operation of the semiconductor device 1*b* illustrated in FIG. 8 will be described by using FIG. 9. FIG. 9 is a flowchart illustrating one example of the data reading operation of the semiconductor device 1*b*. Incidentally, in the following, operations which are different from those of the semiconductor device 1*a* will be mainly described.

First, the read request signal RRQ1 is generated by the master circuit 12 and is supplied to the bus B1 (step S201).

Thereafter, the bit width of the address information included in the read request signal RRQ1 is adjusted by the address adjustment section 115*b*. In addition, it is decided whether the data D1 which is scheduled to be read out in accordance with the read request signal RRQ1 concerned is the generation object for the error detection code C1 (step S211).

For example, in a case where the data D1 which is scheduled to be read out is the generation object for the error detection code C1 (YES in step S211), the read request signal RRQ2 is generated similarly to the case of the semiconductor device 1*a* (step S202). Data reading processing which is similar to that in the case of the semiconductor device 1*a* is performed (step S203 to step S207) also after that.

On the other hand, in a case where the data D1 which is scheduled to be read out is not the generation object for the error detection code C1 (NO in step S211), generation of the read request signal RRQ2 is not performed. After that, for example, the read request signal RRQ1 is allocated to the memory controller 13_1 by the request routing circuit 117 (step S212). Then, when the read request signal RRQ1 is received, the memory controller 13_1 reads the data D1 which is stored in the storage area of the address which is designated by the address information included in the read request signal RRQ1 in the storage areas of the memory M1 (step S213).

Thereafter, the plurality of pieces of data which are read out of the memories M1 to M4 are selected and sent back to the master circuit 12 in order by the response routing circuit 118. Incidentally, since the read-out data D1 is not the generation object for the error detection code, the data D1 is not subjected to error detection by the diagnosis circuit 1182 and is sent back to the master circuit 12 as it is (step S213).

The semiconductor device 1*b* is able to exhibit the effect which is almost equivalent to that in the case of the semiconductor device 1*a* in this way. Further, the semiconductor device 1*b* is able to select the generation object (that is, an error detection object) for the error detection code C1 from within the plurality of pieces of write data D1.

(Third Specific Configuration Example of Data Writing Circuit Part Arranged in Semiconductor Device 1)

Figure 10:
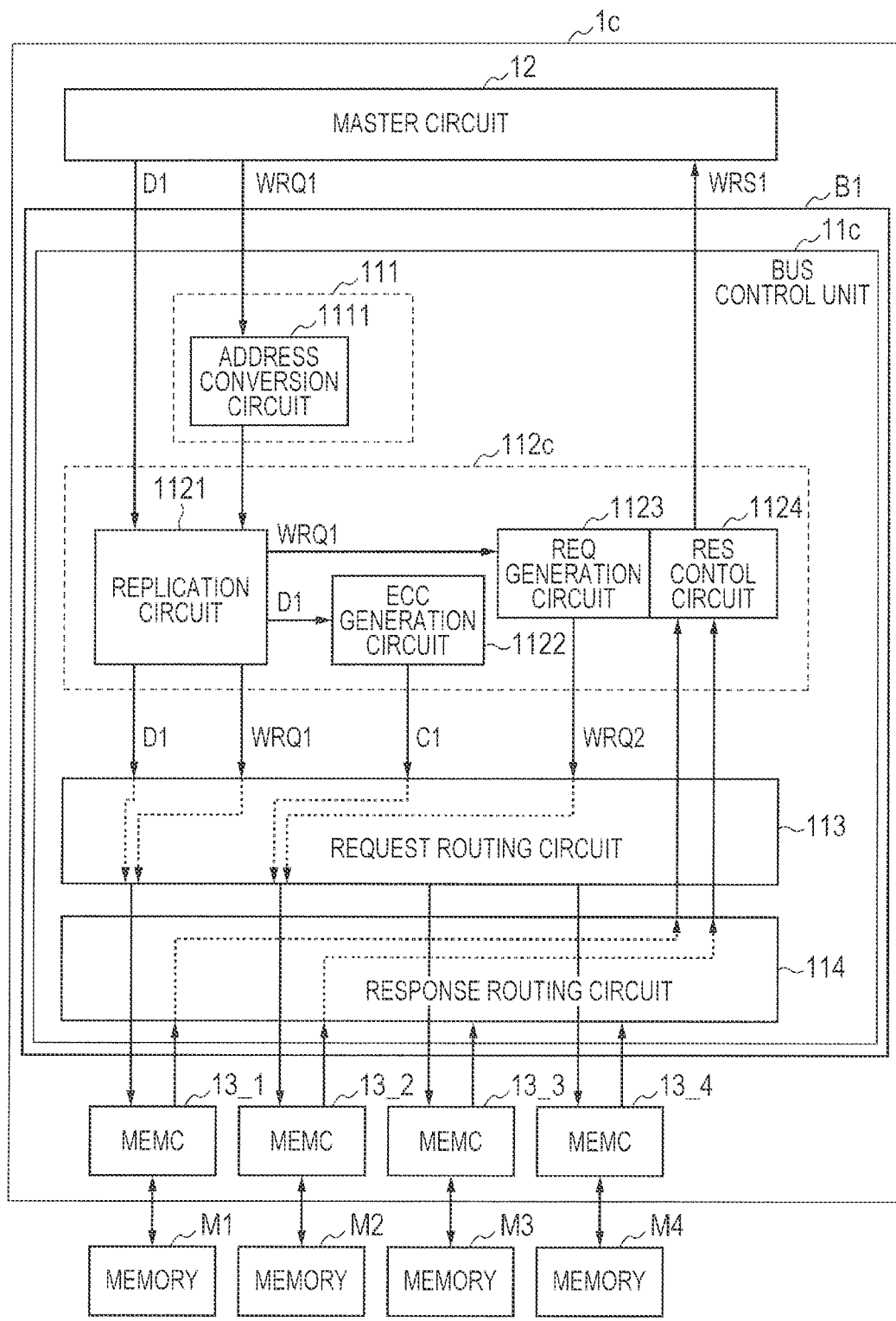
FIG. 10 is a block diagram illustrating a third specific configuration example of the data writing circuit part provided in the semiconductor device illustrated in FIG. 1.

FIG. 10 is a block diagram illustrating the third specific configuration example of the data writing circuit part arranged in the semiconductor device 1 as a semiconductor device 1*c*. Incidentally, also the memories M1 to M4 are illustrated in addition to the semiconductor device 1*c* in FIG. 10.

Here, in the semiconductor device 1*c*, a bus (an AXI bus) which conforms to the AXI protocol is adopted as the bus B1. Therefore, in a case where the write request signal WRQ1 is transmitted from the master circuit 12, after the data D1 is written into the memory M1 and so forth, it is necessary for the semiconductor device 1*c* to send back a response signal (in the following, referred to as a write response signal) indicating that the data D1 is written into the memory M1 and so forth to the master circuit 12.

However, simple addition of a function of sending back the write response signal results in sending-back of two signals, a write response signal WRS1 indicating that the data D1 is written into the memory M1 and so forth and a write response signal WRS2 indicating that the error detection code C1 for the data D1 is written into the memory M2 and so forth in response to one write request signal WRQ1.

Accordingly, in the present embodiment, only the write response signal WRS1 is sent back in the write response signal WRS1 indicating that the data D1 is written into the memory M1 and so forth and the write response signal WRS2 indicating that the error detection code C1 for the data D1 is written into the memory M2 and so forth.

Specifically, the semiconductor device 1c illustrated in FIG. 10 includes a bus control unit 11c in place of the bus control unit 11 when compared with the semiconductor device 1a illustrated in FIG. 2. The bus control unit 11c includes an ECC adjustment section 112c in place of the ECC adjustment section 112 and further includes a response routing circuit 114 when compared with the bus control unit 11.

The response routing circuit 114 receives a plurality of write response signals indicating that desirable pieces of data are written into the memories M1 to M4 from the respective memory controllers 13_1 to 13_4 and then transmits the write response signals to a response control circuit 1124 in order. The response control circuit 1124 selects only either one (here, the write response signal WRS1) of response signals, for example, in the write response signal WRS1 indicating that the data D1 is written into the memory M1 and the write response signal WRS2 indicating that the error detection code C1 for the data D1 is written into the memory M2 and sends back the selected response signal to the master circuit 12.

Thereby, the master circuit 12 is able to receive one write response signal WRS1 in response to transmission of one write request signal WRQ1 in accordance with the AXI protocol.

Since other configurations of the data writing circuit part of the bus control unit 11c are the same as those in the case of the bus control unit 11, description thereof is omitted.
(Third Specific Configuration Example of Data Reading Circuit Part Arranged in Semiconductor Device 1c)

Figure 11:
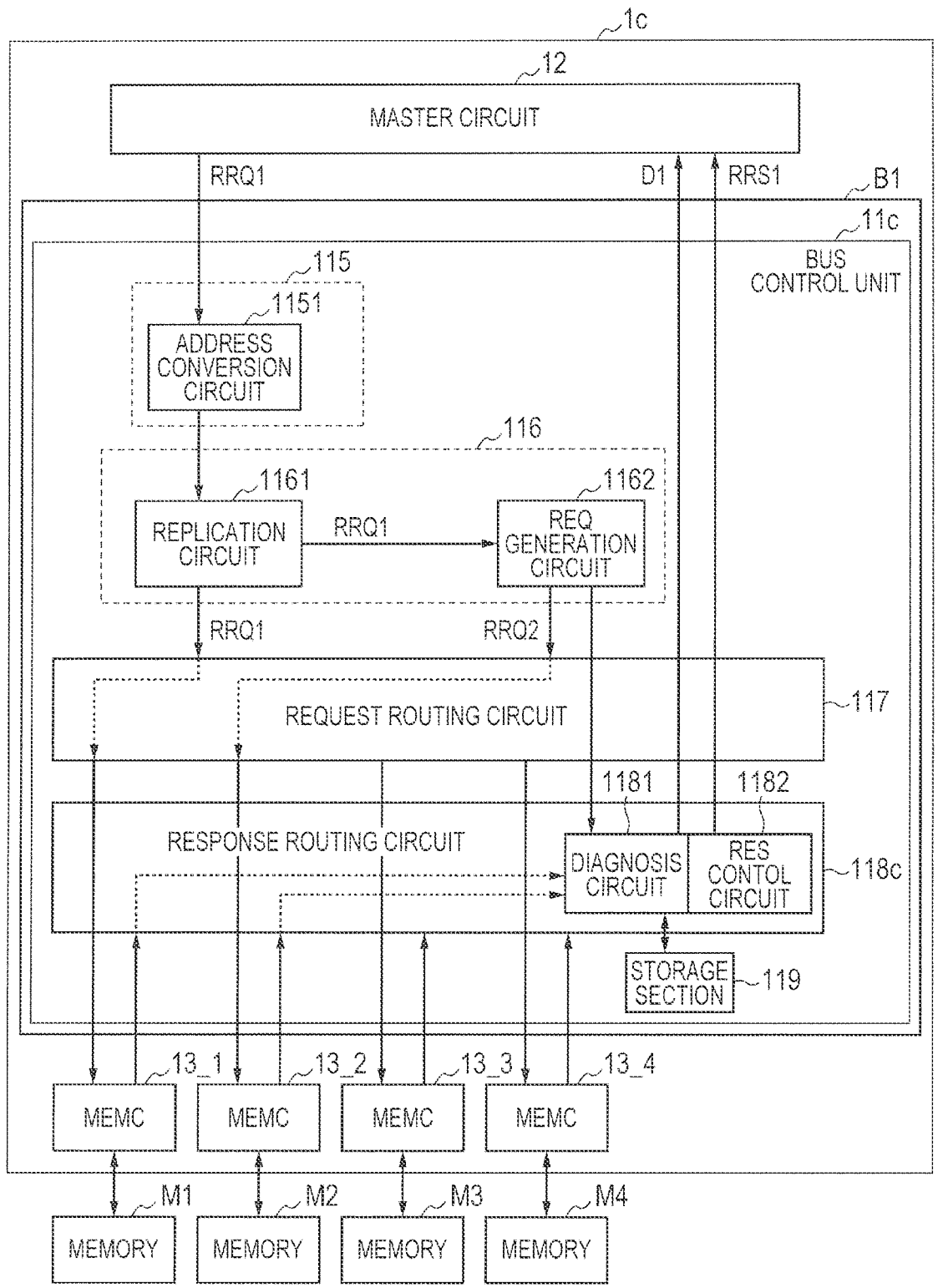
FIG. 11 is a block diagram illustrating a third specific configuration example of the data reading circuit part provided in the semiconductor device illustrated in FIG. 1.

FIG. 11 is a block diagram illustrating the third specific configuration example of the data reading circuit part arranged in the semiconductor device 1c. Incidentally, also the memories M1 to M4 are illustrated in addition to the semiconductor device 1c in FIG. 11.

Here, in the semiconductor device 1c, the bus (the AXI bus) which conforms to the AXI protocol is adopted as the bus B1. Therefore, in a case where the read request signal RRQ1 is transmitted from the master circuit 12, after the data D1 is read out of the memory M1 and so forth, it is necessary for the semiconductor device 1c to send back a response signal (in the following, referred to as a read response signal) indicating that the data D1 is readout of the memory M1 and so forth to the master circuit 12.

However, simple addition of a function of sending back the read response signal results in sending-back of two signals, a read response signal RRS1 indicating that the data D1 stored in the memory M and so forth is read out and a read response signal RRS2 indicating that the error detection code C1 for the data D1 stored in the memory M2 and so forth is read out in response to one read request signal RRQ1.

Accordingly, in the present embodiment, only the read response signal RRS1 is sent back in the read response signal RRS1 indicating that the data D1 is read out of the memory M1 and so forth and the read response signal RRS2 indicating that the error detection code C1 for the data D1 is read out of the memory M2 and so forth.

Specifically, the semiconductor device 1c illustrated in FIG. 11 includes the bus control unit 11c in place of the bus control unit 11 when compared with the semiconductor device 1a illustrated in FIG. 4. The bus control unit 11c is different in configuration of the response routing circuit 118 when compared with the bus control unit 11.

A response routing circuit 118c further includes a response control circuit 1182 in addition to the diagnosis circuit 1181. The response control circuit 1182 selects only either one (here, the read response signal RRS1) of response signals, for example, in the read response signal RRS1 indicating that the data D1 is read out of the memory M1 and so forth and the read response signal RRS2 indicating that the error detection code C1 for the data D1 is read out of the memory M2 and so forth and sends back the selected response signal to the master circuit 12.

Thereby, the master circuit 12 is able to receive one read response signal RRS1 in response to transmission of one read request signal RRQ1 in accordance with the AXI protocol.

Since other configurations of the data reading circuit part of the bus control unit 11c are the same as those in the case of the bus control unit 11, description thereof is omitted.

Second Embodiment

Figure 12:
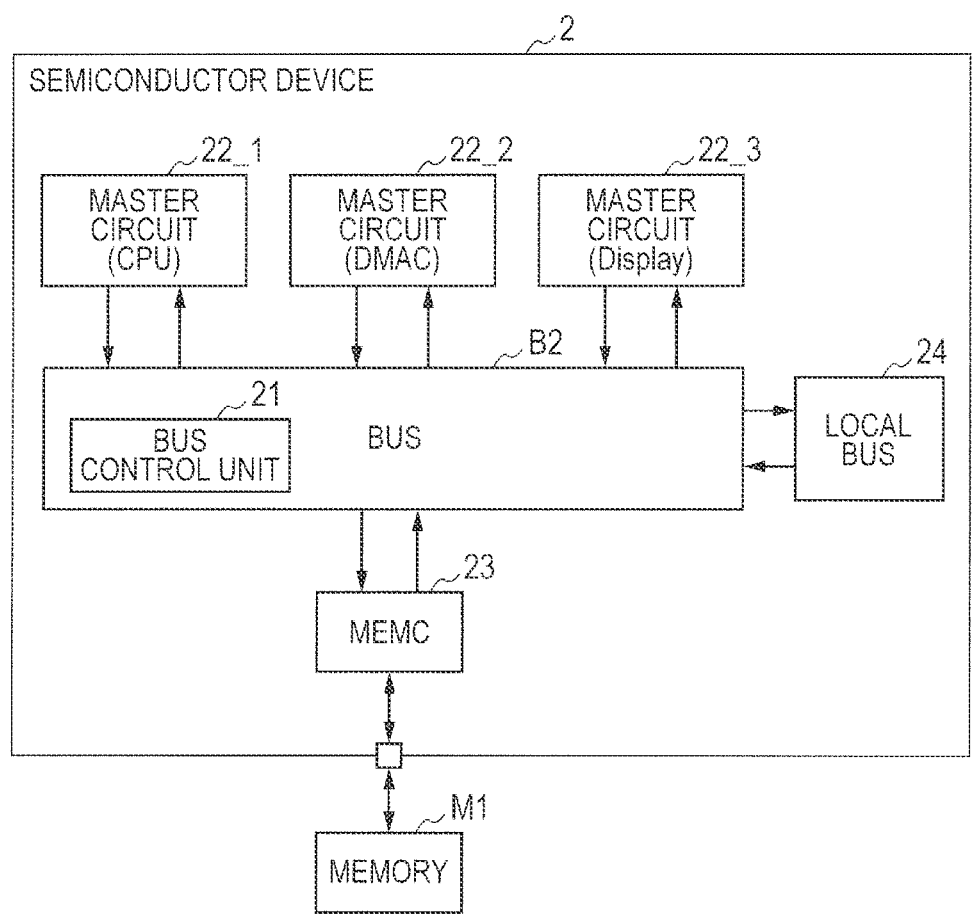
FIG. 12 is a block diagram illustrating one configuration example of a semiconductor system according to a second embodiment.

FIG. 12 is a block diagram illustrating a configuration example of a semiconductor device 2 according to the second embodiment and a semiconductor system SYS2 equipped with the semiconductor device 2. In the semiconductor system SYS1, the plurality of memories M1 to M4 are arranged. On the other hand, in the semiconductor system SYS2, only the single memory M1 is arranged. In the following, description will be made specifically.

As illustrated in FIG. 12, the semiconductor system STS2 includes one memory M1 and the semiconductor device 2 which accesses the memory M1. The semiconductor device 2 includes master circuits (in the following, also referred to as a master circuit 22 simply) such as a CPU 22_1, a DMAC 22_2, a display 22_3 and so forth, a bus B2, a local bus 24 and a memory controller (MEMC) 23. A bus control unit 21 is arranged on the bus B2.

Incidentally, the CPU 22_1, the DMAC 22_2, the display 22_3, the bus B2, the local bus 24 and the memory controller 23 in the semiconductor device 2 correspond to the CPU 12_1, the DMAC 12_2, the display 12_3, the bus B1, the local bus 14 and the memory controller 13_1 respectively in the semiconductor device 1.
(Specific Configuration Example of Data Writing Circuit Part Arranged in Semiconductor Device 2)

Figure 13:
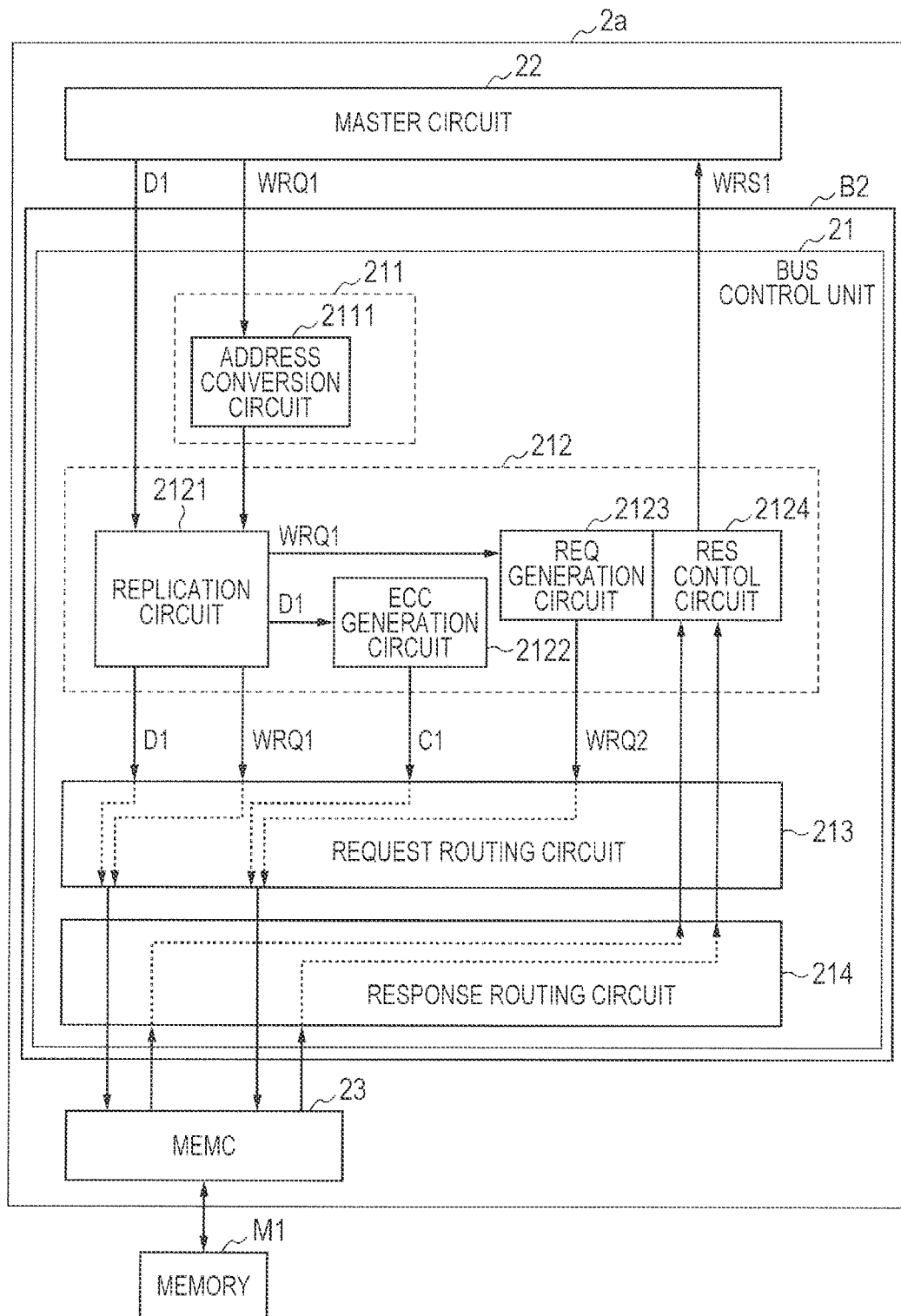
FIG. 13 is a block diagram illustrating a first specific configuration example of a data writing circuit part provided in the semiconductor device illustrated in FIG. 12.

FIG. 13 is a block diagram illustrating the specific configuration example of the data writing circuit part arranged in the semiconductor device 2 as a semiconductor device 2a. Incidentally, also the memory M1 is illustrated in addition to the semiconductor device 2a in FIG. 13.

As illustrated in FIG. 13, the semiconductor device 2a includes the master circuit 22, the bus control unit 21 arranged on the bus B2 and the memory controller 23 as the data writing circuit part. The bus control unit 21 includes an address adjustment section 211, an ECC adjustment section 212, a request routing circuit 213 and a response routing circuit 214. In addition, the address adjustment section 211 includes an address conversion circuit 2111. The ECC adjustment section 212 includes a replication circuit 2121, an ECC generation circuit 2122, an ECC request generation circuit 2123 and a response control circuit 2124.

Incidentally, the address adjustment section 211, the ECC adjustment section 212, the request routing circuit 213 and the response routing circuit 214 correspond to the address adjustment section 111, the ECC adjustment section 112, the request routing circuit 113 and the response routing circuit 114 respectively. In addition, the address conversion circuit 2111, the replication circuit 2121, the ECC generation circuit 2122, the ECC request generation circuit 2123 and the response control circuit 2124 correspond to the address conversion circuit 1111, the replication circuit 1121, the ECC generation circuit 1122, the ECC request generation circuit 1123 and the response control circuit 1124 respectively.

Here, since both of the data D1 and the error detection code C1 for the data D1 are written into the common memory M1, the address information included in the write request signal WRQ2 which is generated by the ECC request generation circuit 2123 indicates a value which is different from the value of the address information included in the write request signal WRQ1 which is generated by the master circuit 22. For example, a value of a low-order bit of the address information included in the write request signal WRQ2 indicates an inverted value of a value of a low-order bit of the address information included in the write request signal WRQ1.

In addition, the request routing circuit 213 serially allocates the write request signals WRQ1 and WRQ2 to the memory controller 23. Thereby, the memory controller 23 writes the data D1 into the storage area of the address which is designated on the bases of the write request signal WRQ1 and thereafter writes the error detection code C1 for the data D1 into the storage area of the address which is designated on the basis of the write request signal WRQ2 in the storage areas of the memory M1.

Since other configurations and operations of the data writing circuit part of the bus control unit 21 are the same as those in the case of the bus control unit 11c, description thereof is omitted.

In the semiconductor device 2 according to the present embodiment and the semiconductor system SYS2 equipped with the semiconductor device 2, the bus control section 21 which is arranged on the bus B2 generates the write request signal WRQ2 which includes the address information which is different from the address information included in the write request signal WRQ1 on the basis of the write request signal WRQ1 received from the master circuit 22 in this way. Then, the bus control unit 21 transmits the write request signal WRQ1, for example, to the memory controller 23 and makes the memory controller 23 write the data D1 into the memory M1 and thereafter transmits the write request signal WRQ2 to the memory controller 23 and makes the memory controller 23 write the error detection code C1 for the data D1 into the memory M1.

That is, in the semiconductor device 2 according to the present embodiment and the semiconductor system SYS2 equipped with the semiconductor device 2, although paths for memory access between the bus B2 which is arranged between the CPU 22_1 and the memory controller 23 and the memory controller 23 are the same as each other, the address information used for data writing is different from the address information used for error detection code writing. Thereby, in a case where a bit error occurs in either one of an address signal used for writing the data D1 which is transmitted from the bus B2 to the memory M1 via the memory controller 23 and an address signal used for writing the error detection code C1 which is transmitted from the bus B2 to the memory M1 via the memory controller 23, the combinations for the data D1 and for the error detection code C1 which are read out become different from each other. Therefore, it is possible to correctly detect the error in ECC checking. For example, in a case where a stuck-at fault occurs in one bit of a common address bus, in a case where address values of one bit concerned are different from each other in the both address signals, only one of the address signals becomes an error. In this case, since the combinations for the data D1 and for the error detection code C1 which are read out become different from each other, it is possible to correctly detect the error in ECC checking. Thereby, it becomes possible for the semiconductor device 2 according to the present embodiment and the semiconductor system SYS2 equipped with the semiconductor device 2 to improve the reliability.

(Specific Configuration Example of Data Reading Circuit Part Arranged in Semiconductor Device 2a)

Figure 14:
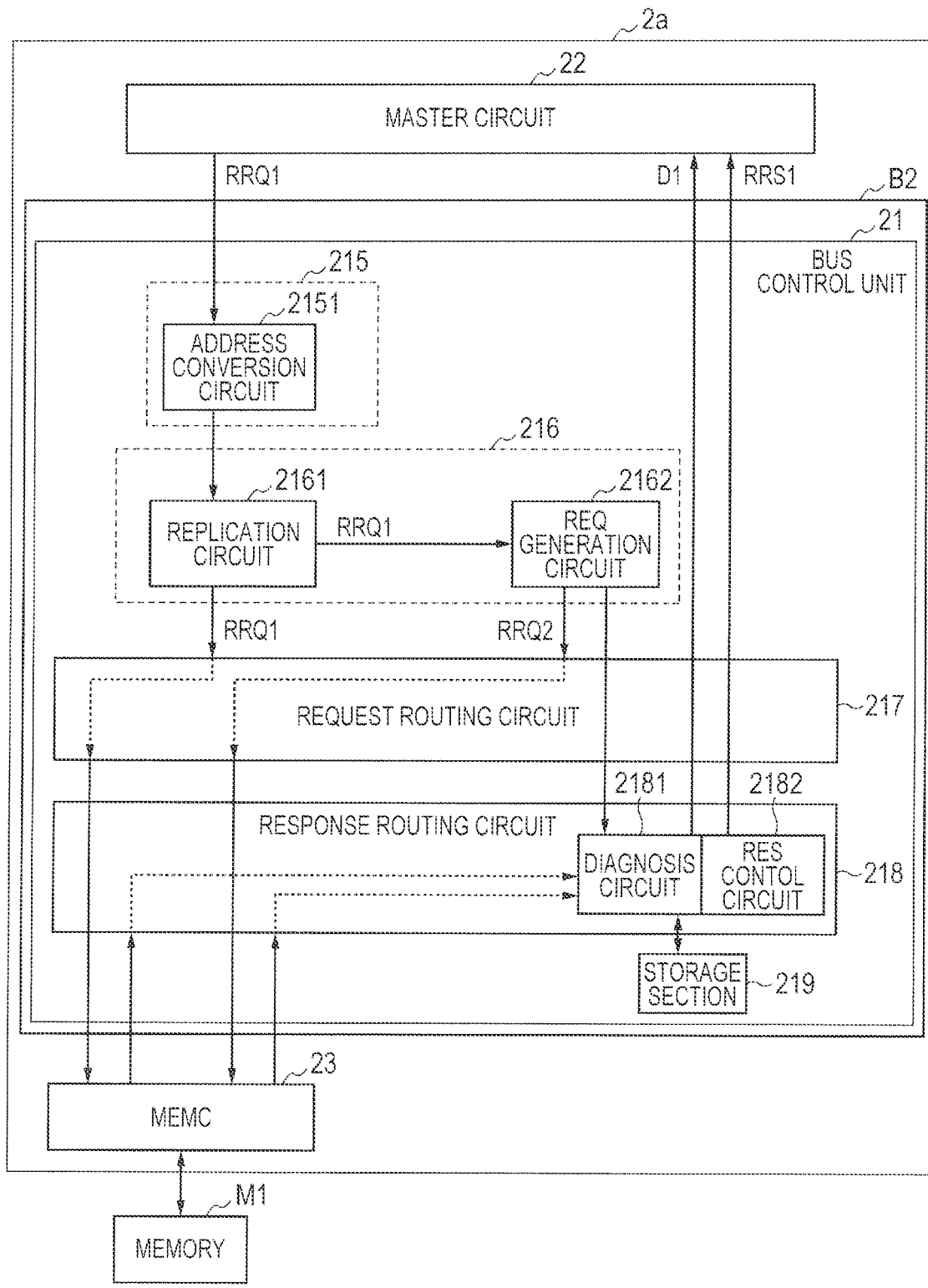
FIG. 14 is a block diagram illustrating a first specific configuration example of a data reading circuit part provided in the semiconductor device illustrated in FIG. 12.

FIG. 14 is a block diagram illustrating the specific configuration example of the data reading circuit part despised in the semiconductor device 2a. Incidentally, also the memory M1 is illustrated in addition to the semiconductor device 2a in FIG. 14.

As illustrated in FIG. 14, the semiconductor device 2a includes the master circuit 22, the bus control unit 21 arranged on the bis B2 and the memory controller 23 as the data reading circuit part. The bus control unit 21 includes an address adjustment section 215, an ECC adjustment section 216, a request routing circuit 217, a response routing circuit 218 and a storage section 219. In addition, the address adjustment section 215 has an address conversion circuit 2151. The ECC adjustment section 216 has a replication circuit 2161 and an ECC request generation circuit 2162. The response routing circuit 218 has a diagnosis circuit 2181 and a response control circuit 2182.

Although in the present embodiment, a case where the address adjustment 215, the ECC adjustment section 216, the request routing circuit 217 and the response routing circuit 218 which are used for data reading are provided separately from those used for data writing will be described, these elements may be shared between the data reading and the data writing.

Incidentally, the address adjustment section 215, the ECC adjustment section 216, the request routing circuit 217 and the response routing circuit 218 correspond to the address adjustment section 115, the ECC adjustment section 116, the request routing circuit 117 and the response routing circuit 118 respectively. In addition, the address conversion circuit 2151, the replication circuit 2161, the ECC request generation circuit 2162, the diagnosis circuit 2181 and the response control circuit 2182 correspond to the address conversion circuit 1151, the replication circuit 1161, the ECC request generation circuit 1162, the diagnosis circuit 1181 and the response control circuit 1182 respectively.

Here, since the data D1 and the error detection code C1 for the data D1 are written into the different storage areas of the common memory M1, the address information included in the read request signal RRQ2 which is generated by the ECC request generation circuit 2162 indicates a value which is different from a value of the address information included in the read request signal RRQ1 which is generated by the master circuit 22. For example, a value of a low-order bit of the address information included in the read request signal RRQ2 indicates an inverted value of a value of a low-order bit of the address information included in the read request signal RRQ1.

In addition, the request routing circuit 217 serially allocates the read request signals RRQ1 and RRQ2 to the memory controller 23. Thereby, the memory controller 23 reads the data D1 stored in the storage area of the address which is designated on the bases of the read request signal RRQ1 and thereafter reads the error detection code C1 for the data D1 stored in the storage area of the address which is designated on the basis of the read request signal RRQ2, for example, in the storage areas of the memory M1.

In this case, the memory controller 23 is able to read the data D1 and the error detection code C1 for the data D1 in succession. Thereby, it becomes possible to promptly execute error detection and bit correction by the diagnosis circuit 2181.

Since other configurations and operations of the data reading circuit part of the bus control unit 21 are the same as those in the case of the bus control 11*c*, description thereof is omitted.

In the semiconductor device 2 according to the present embodiment and the semiconductor system SYS2 equipped with the semiconductor device 2, the bus control section 21 which is arranged on the bus B2 generates the read request signal RRQ2 which includes the address information which is different from the address information included in the read request signal RRQ1 on the basis of the read request signal RRQ1 received from the master circuit 22 in this way. Then, the bus control unit 21 transmits the read request signal RRQ1, for example, to the memory controller 23 and makes the memory controller 23 read the data D1 stored in the memory M1 and transmits the read request signal RRQ2 to the memory controller 23 and makes the memory controller 23 read the error detection code C1 for the data D1 stored in the memory M1.

That is, in the semiconductor device 2 according to the present embodiment and the semiconductor system SYS2 equipped with the semiconductor device 2, although the paths for memory access between the bus B2 which is arranged between the CPU 22_1 and the memory controller 23 and the memory controller 23 are the same as each other, the address information used for data reading is different from the address information used for error detection code reading. Thereby, in a case where the bit error occurs in either one of an address signal used for reading the data D1 which is transmitted from the bus B2 to the memory M1 via the memory controller 23 and an address signal used for reading the error detection code C1 which is transmitted from the bus B2 to the memory M1 via the memory controller 23, the combinations for the data D1 and for the error detection code C1 which are read out become different from each other and therefore it is possible to correctly detect the error in ECC checking. For example, in a case where the stuck-at fault occurs in one bit of the common address bus, in a case where the address values of one bit concerned are different from each other between the both address signals, only one of the address signals becomes the error. In this case, since the combinations for the data D1 and for the error detection code C1 which are read out become different from each other, it is possible to correctly detect the error in ECC checking. Thereby, it becomes possible for the semiconductor device 2 according to the present embodiment and the semiconductor system SYS2 equipped with the semiconductor device 2 to improve the reliability.

Incidentally, although a case where all pieces of the data D1 are the generation objects (that is, error detection objects) of the error detection code C1 is described by way of example, the present invention is not limited thereto. The semiconductor device 2 may be appropriately modified to a configuration that it is possible to select the generation object(s) (that is, the error detection object (s)) for the error detection code C1 from within the plurality of pieces of the data D1 as in the case of the semiconductor device 1*b*.

Other Embodiments

Although in the above-described first and second embodiments, the case where the ECC generation circuit 1122 and so forth generate the 8-bit width error detection code C1 for the 64-bit width data D1 is described by way of example, the present invention is not limited thereto. It is possible to appropriately modify the ECC generation circuit 1122 and so forth into a configuration that the error detection code C1 of an optional bit width is generated for the data D1 of an optional bit width. For example, it is possible to appropriately modify the ECC generation circuit 1122 and so forth into a configuration that the error detection code C1 of the 5-bit width is generated for the data D1 of the 8-bit width. Alternatively, the ECC generation circuit 1122 and so forth may be configured that selection between a first mode in which the 8-bit width error detection code C1 is generated for the 64-bit width data D1 and a second mode in which the 5-bit width error detection code C1 is generated for the 8-bit width data D1 is possible. In the first mode, a bandwidth and a data volume are suppressed and in the second mode, the reliability is improved.

In addition, the request routing circuit 113 and so forth may be also configured to make selection of a memory to be accessed the next and a storage area of the memory possible on the basis of an access status (for example, access frequency to each memory, bandwidth usage of each channel) to the memories M1 to Mn (n is a natural number) which are accessing objects. For example, the request routing circuit 113 may be configured to change the accessing object from the memory M1 to, for example, the memory M3 which is low in access frequency in a case where the frequency of access to the memory M1 reaches set frequency. Thereby, it becomes possible to prevent concentration of accesses to a specific memory and to disperse the load.

Further, the semiconductor devices according to the above-described first and second embodiment each may further include a control circuit which manages a bus access right on the basis of whether the request signal transmitted from the master circuit 12 is a replication object. This control circuit grants the bus access right for two request signals to the master circuit 12, for example, in a case where the request signal which is transmitted from the master circuit 12 is the replication object and grants the bus access right for one request signal to the master circuit 12 in a case where the request signal which is transmitted from the master circuit 12 is not the replication object. Thereby, for example, in a case where the request signal which is the replication object is issued, it is possible to put the master circuit 12 on standby without granting the bus access right even in a case where the bus access right for one request signal is vacant.

The invention made by the present inventors is specifically described on the basis of the embodiments as above. However, it goes without saying that the present invention is not limited to the already described embodiments and may be modified and altered in a variety of ways within a range not deviating from the gist of the present invention.

Although some or all of the above-described embodiments may be also described as in the following additional remarks, the embodiments are not limited to the following.

(Additional Remark 1)

A semiconductor device which includes a master circuit which outputs a first write request signal used for requesting to write data, a bus which receives the data and the first write request signal, a bus control unit which is arranged on the bus, generates an error detection code for the data and generates a second write request signal which includes second address information which corresponds to first address information included in the first write request signal and a memory controller which writes the data which is transmitted from the bus into a storage area of an address which is designated by the first write request signal which is transmitted from the bus and writes the error detection code which is transmitted from the bus into a storage area of an address which is designated by the second write request signal which is transmitted from the bus in the storage areas of a memory.

(Additional Remark 2)

The semiconductor device described in Additional Remark 1 in which the master circuit is further configured to output a first read request signal used for requesting to read the data written into the memory, in which the bus control unit is further configured to generate a second read request signal which includes the second address information which corresponds to the first address information included in the first read request signal and in which the memory controller is further configured to read the data stored in the storage area of the address designated by the first read request signal which is transmitted from the bus and to read the error detection code for the data which is stored in the storage area of the address designated by the second read request signal which is transmitted from the bus in the storage areas of the memory.

(Additional Remark 3)

The semiconductor device described in Additional Remark 1 in which the bus control unit includes an ECC (Error Correcting Code) generation circuit which generates the error detection code for the data.

(Additional Remark 4)

The semiconductor device described in Additional Remark 1 in which the bus control unit includes an ECC (Error Correcting Code) generation circuit which selectively outputs either one of the error detection code of a first bit width and the error detection code of a second bit width which is different from the first bit width for the data in accordance with a mode.

(Additional Remark 5)

The semiconductor device described in Additional Remark 1 in which the memory is configured by first to n-th (n is an integer which is 2 or more) memories, in which the memory controller is configured by first to n-th memory controllers which access the first to n-th memories respectively and in which the bus control unit includes a request routing circuit which allocates the data and the first write request signal to any one of the memory controllers which is selected on the basis of statuses of access to the first to n-th memories by the first to n-th memory controllers and allocates the data and the first write request signal to any other memory controller which is selected on the basis of the statuses of access to the first to n-th memories by the first to n-th memory controllers.

(Additional Remark 6)

The semiconductor device described in Additional Remark 2 in which the memory is configured by first to n-th (n is an integer which is 2 or more) memories, in which the memory controller is configured by first to n-th memory controllers which access the first to n-th memories respectively and in which the bus control unit includes a request routing circuit which allocates the data and the first read request signal to any one of the memory controllers which is selected on the basis of statuses of access to the first to n-th memories by the first to n-th memory controllers and allocates the data and the first read request signal to any other memory controller which is selected on the basis of the statuses of access to the first to n-th memories by the first to n-th memory controllers.

(Additional Remark 7)

The semiconductor device described in Additional Remark 1 in which the bus control unit controls the number of rights to access the bus to be granted to the master circuit on the basis of whether the first write request signal which is transmitted from the master circuit is a replication object.

(Additional Remark 8)

The semiconductor device described in Additional Remark 1 in which the bus control unit grants a right to access the bus for two request signals to the master circuit in a case where the first write request signal which is transmitted from the master circuit is a replication object and grants the right to access the bus for one request signal to the master circuit in a case where the first write request signal which is transmitted from the master circuit is not the replication object.

(Additional Remark 9)

The semiconductor device described in Additional Remark 2 in which the bus control unit controls the number of rights to access the bus to be granted to the master circuit on the basis of whether the first read request signal which is transmitted from the master circuit is a replication object.

(Additional Remark 10)

The semiconductor device described in Additional Remark 2 in which the bus control unit grants a right to access the bus for two request signals to the master circuit in a case where the first read request signal which is transmitted from the master circuit is a replication object and grants the right to access the bus for one request signal to the master circuit in a case where the first read request signal which is transmitted from the master circuit is not the replication object.

What is claimed is:

1. A semiconductor device comprising;
    a master circuit generating a first request signal including first address information for memory access;
    a bus control unit provided on a bus and having a request signal generation circuit which receives the first request signal and is configured to generate a second request signal including second address information based on the first request signal; and
    a memory controller receiving the first request signal and the second request signal from the bus control unit and performing the memory access for each of the first request signal and the second request signal,
    wherein the first request signal is transmitted from the bus control unit to the memory controller through a first signal path, wherein the second request signal is transmitted from the bus control unit to the memory controller through a second signal path, and wherein the second signal path is different from the first signal path such that the second request signal does not travel through any part of the first signal path.

2. The semiconductor device according to claim 1, wherein the master circuit generates a first write request signal as the first request signal and write data, wherein the bus control unit receives the first write request signal and the write data and further comprises an error detection code generation circuit configured to generate an error detection code based on the write data, wherein the request signal generation circuit is configured to generate a second write request signal as the second request signal based on the first write request signal, and wherein the memory controller performs a first memory access to write the write data transmitted from the bus control unit into a first storage area of the memory based on the first address information of the first write request signal and performs a second memory access to write the error detection code transmitted from the bus control unit into a second storage area of the memory based on the second address information of the second write request signal.

3. The semiconductor device according to claim 2, wherein the error detection code generation circuit is configured to generate at least one of a first error detection code having a first bit width and a second error detection code having a second bit width different from the first bit width, based on a mode.

4. The semiconductor device according to claim 1, wherein the memory controller comprises a first memory controller for accessing a first memory included in the memory, and second memory controller for accessing a second memory included in the memory, wherein the bus control unit further comprises a request routing circuit configured to allocate each of the first request signal and the second request signal to any one of the first memory controller and the second memory controller based on access statuses to the first and the second memory.

5. The semiconductor device according to claim 1, wherein the bus control unit is configured to determine whether the second request signal is to be generated based on the first request signal, and to control the number of rights to access the bus to be granted to the master circuit based on the determination result.

6. The semiconductor device according to claim 5, wherein the bus control unit grants a right to access the bus of two request signals to the master circuit when it is determined that the second request signal is to be generated based on the first request signal, and grants the right to access the bus of one request signal to the master circuit when it is determined that the second request signal is not to be generated.

7. The semiconductor device according to claim 1, wherein the master circuit generates a first read request signal as the first request signal for requesting data written into the memory, wherein the bus control unit receives the first read request signal, wherein the request signal generation circuit generate a second read request signal as the second request signal based on the first read request signal, and wherein the memory controller performs a first memory access to read data stored in a first storage area of the memory based on the first address information of the first read request signal and performs a second memory access to read an error detection code stored in a second storage area of the memory based on the second address information of the second read request signal.

* * * * *